(12) United States Patent
Aizawa et al.

(10) Patent No.: US 11,248,962 B2
(45) Date of Patent: Feb. 15, 2022

(54) FOREIGN MATTER ANALYSIS METHOD, STORAGE MEDIUM STORING FOREIGN MATTER ANALYSIS PROGRAM, AND FOREIGN MATTER ANALYSIS APPARATUS

(71) Applicant: JASCO CORPORATION, Tokyo (JP)

(72) Inventors: Kento Aizawa, Tokyo (JP); Yoshiko Kubo, Tokyo (JP); Erika Taira, Tokyo (JP); Yuji Higuchi, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 0 days.

(21) Appl. No.: 17/142,635

(22) Filed: Jan. 6, 2021

(65) Prior Publication Data
US 2021/0247233 A1     Aug. 12, 2021

(30) Foreign Application Priority Data
Jan. 10, 2020    (JP) ............................. JP2020-002767

(51) Int. Cl.
*G01J 3/45*       (2006.01)
*G01N 21/359*    (2014.01)
(Continued)

(52) U.S. Cl.
CPC ................. *G01J 3/45* (2013.01); *G01N 21/27* (2013.01); *G01N 21/359* (2013.01);
(Continued)

(58) Field of Classification Search
CPC ......... G01J 3/45; G01N 21/359; G01N 21/27; G01N 21/3563; G01N 21/65; G02B 21/0064
See application file for complete search history.

(56) References Cited

U.S. PATENT DOCUMENTS

| | | | |
|---|---|---|---|
| 6,545,755 B1 * | 4/2003 | Ishihama | G01J 3/44 356/237.3 |
| 10,317,283 B2 | 6/2019 | Sunami et al. | |

(Continued)

FOREIGN PATENT DOCUMENTS

JP      2018-112762 A     7/2018

OTHER PUBLICATIONS

Watanabe et al.; "Application of Multivariate Statistical Analysis to Spectrum-Imaging Datasets: Benefits and Disadvantages," The Japanese Society of Microscopy; vol. 50, Issue 1, p. 23-27; <http://microscopy.or.jp/jsm/wp-content/uploads/publication/kenbikyo/50_1/pdf/50-1-23.pdf>; dated Apr. 30, 2015, and an English language translation thereof.

(Continued)

*Primary Examiner* — Dominic J Bologna
(74) *Attorney, Agent, or Firm* — Greenblum & Bernstein, P.L.C.

(57) ABSTRACT

A method of analyzing foreign matter in a sample includes:
measuring an optical spectrum for each of a plurality of measurement points of a measurement region on the sample by a microscopic spectroscope;
calculating a feature value of each measured spectrum by a computer;
determining whether each of the measurement points is on the foreign matter or not based on each feature value;
retaining the spectrum of the measurement point that is determined to be on the foreign matter, and
deleting the spectrum of the measurement point that is not determined to be on the foreign matter or storing the same to a storage unit; and (Continued)

executing multivariate analysis of the spectra of the plurality of the measurement points that are determined to be on the foreign matter or classifying the same with AI search.

15 Claims, 18 Drawing Sheets

(51) Int. Cl.
*G02B 21/00* (2006.01)
*G01N 21/65* (2006.01)
*G01N 21/27* (2006.01)
*G01N 21/3563* (2014.01)

(52) U.S. Cl.
CPC ......... *G01N 21/3563* (2013.01); *G01N 21/65* (2013.01); *G02B 21/0064* (2013.01)

(56) References Cited

U.S. PATENT DOCUMENTS

| 10,393,656 | B2 | 8/2019 | Soga et al. |
| 2012/0056082 | A1* | 3/2012 | Werner .............. G01N 21/3563 250/252.1 |
| 2016/0341657 | A1* | 11/2016 | Sato ........................ G01N 21/65 |
| 2017/0205385 | A1* | 7/2017 | Prystupa ............. A22C 17/0073 |
| 2018/0365822 | A1* | 12/2018 | Nipe ........................ G06K 9/46 |
| 2021/0055211 | A1* | 2/2021 | Nagamori .............. G01N 21/35 |

OTHER PUBLICATIONS

U.S. Appl. No. 17/119,272 to Kento AIZAWA et al., which was filed Dec. 11, 2020.

* cited by examiner

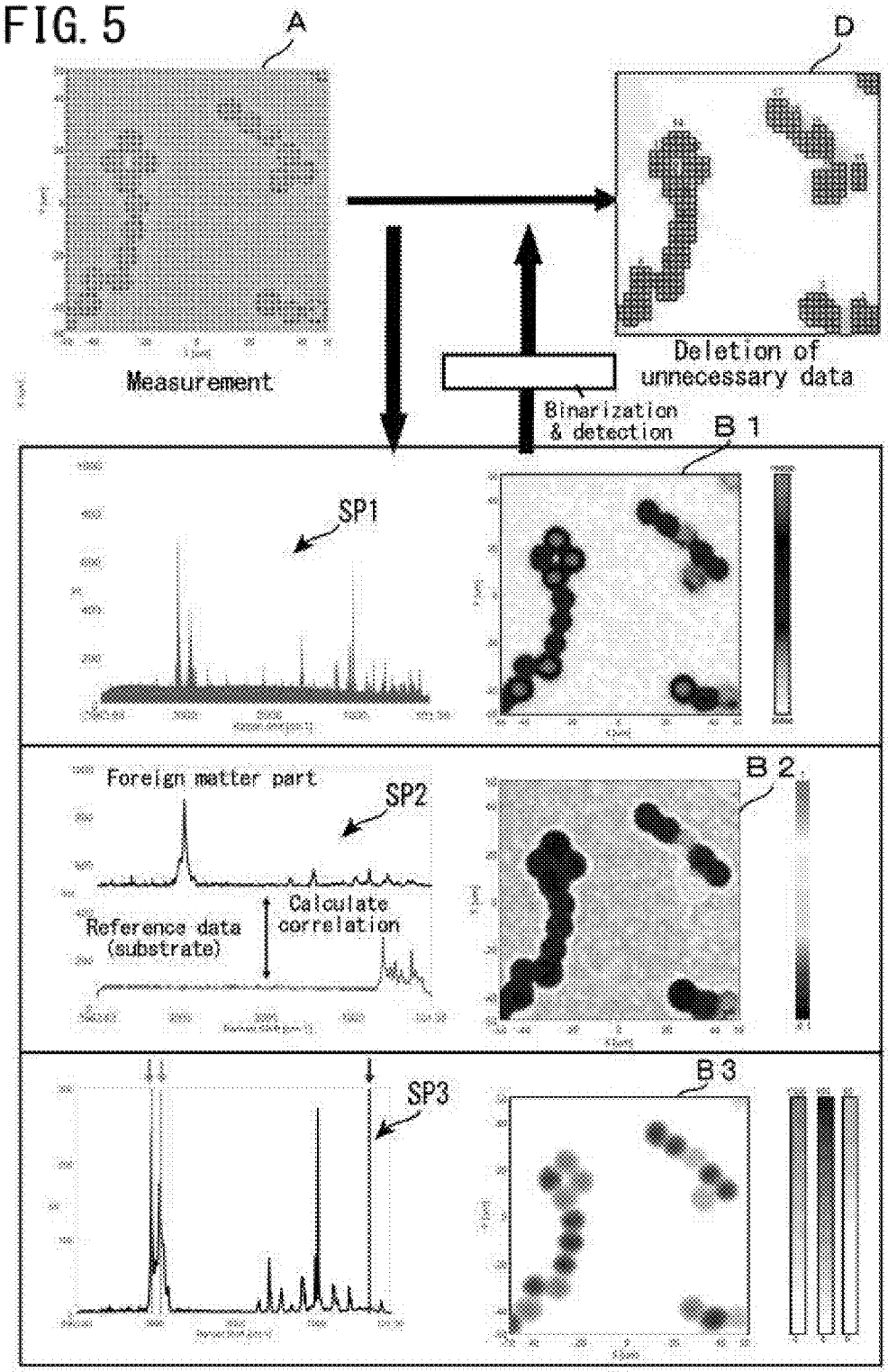

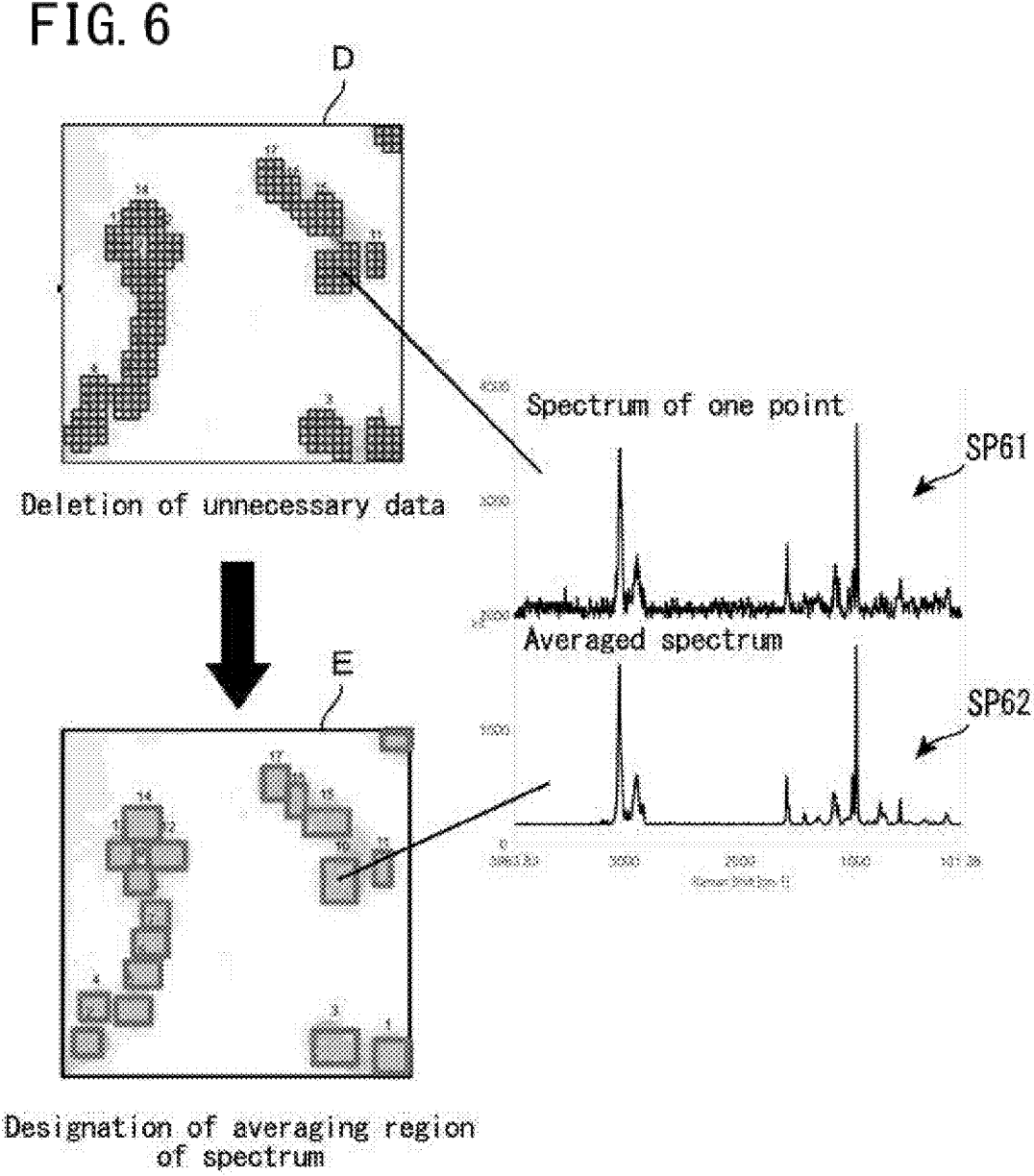

Depending on types of foreign matter, it can be distinguished by spectral measuring even if it cannot be seen in observation image.

Observation image      Spectral image

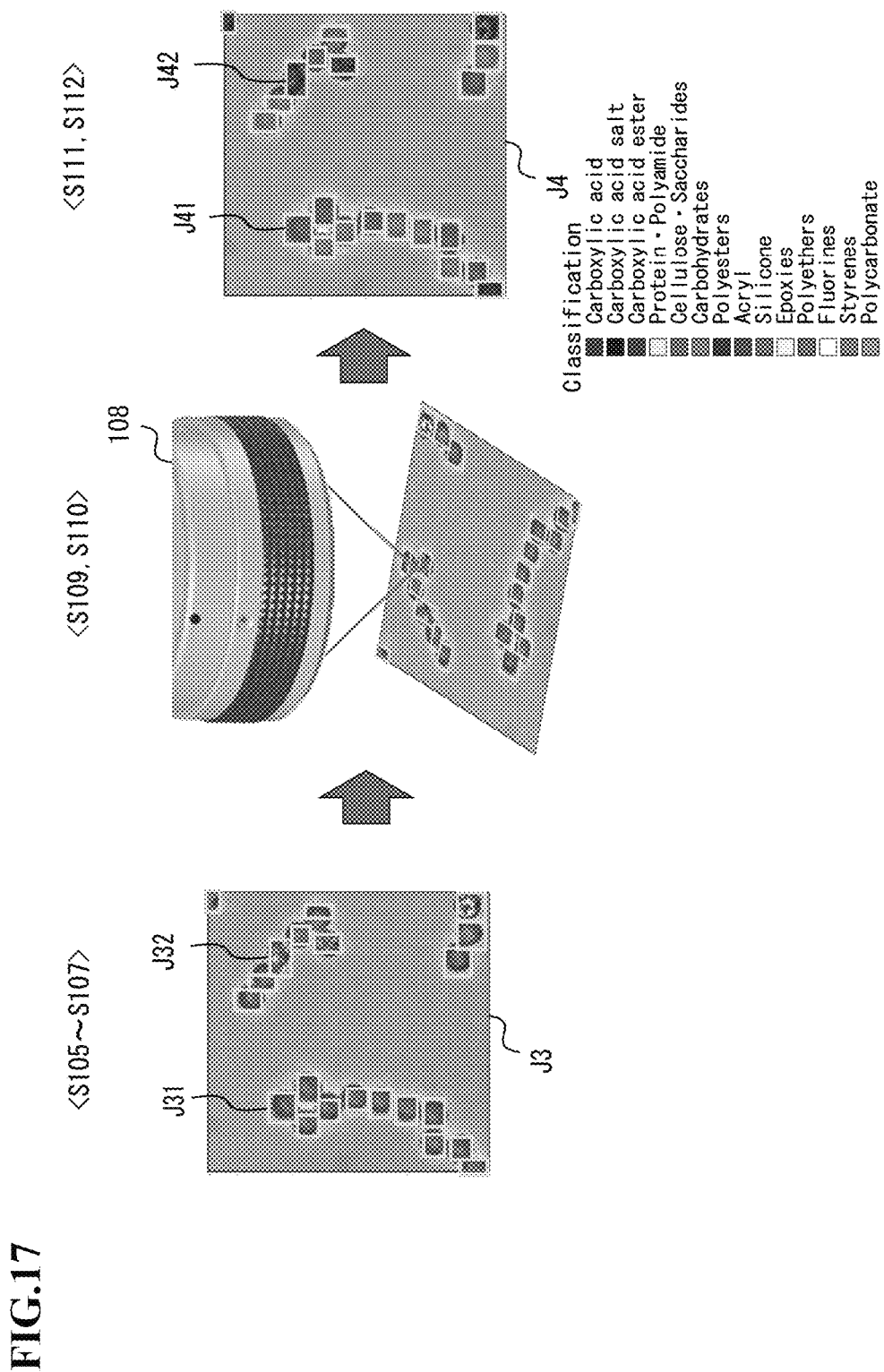

FOREIGN MATTER ANALYSIS METHOD, STORAGE MEDIUM STORING FOREIGN MATTER ANALYSIS PROGRAM, AND FOREIGN MATTER ANALYSIS APPARATUS

RELATED APPLICATIONS

This application claims the priority of Japanese Patent Application No. 2020-2767 filed on Jan. 10, 2020, the disclosure of which is incorporated herein by reference in its entirety.

FIELD OF THE INVENTION

The present invention relates to a method of recognizing and analyzing foreign matters in a measurement target such as a sample by using a microscopic spectroscope (such as Raman spectrometer, infrared spectrometer, ultraviolet-visible spectrophotometer, spectrofluorometer, etc.) that irradiates light to the measurement target to measure optical spectra of transmitted light, reflected light, scattering light, or fluorescence.

BACKGROUND OF THE INVENTION

When presence/absence of "foreign matter" having a component different from the original components of the measurement target is to be determined, an analysis apparatus that can detect the foreign matter without overlooking and can further specify the substance constituting the foreign matter with good accuracy is demanded.

Measurement ability of microscopic spectroscopes has improved in recent years, and a plurality of measurement points can be set in a measurement region that contains a foreign matter, and numerous spectra can be measured. A technique of spectral imaging that displays a distribution state of a foreign matter in the measurement target as a two-dimensional or three-dimensional image (spectral image) by statistically analyzing these spectra has been developed. Furthermore, it is now possible to identify the constituents of a foreign matter by a spectrum search program using a database, and reflect the result thereof to the spectral image.

As a technique of statistically analyzing numerous spectra, multivariate analysis is very effective. Non-patent literature 1 introduces benefits and disadvantages of spectral imaging using multivariate analysis.

CITATION LIST

Non-Patent Literature

NON-PATENT LITERATURE 1: Watanabe, Ishizuka, "Application of Multivariate Statistical Analysis to Spectrum-Imaging Datasets: Benefits and Disadvantages", Microscope, The Japanese Society of Microscopy, 2015, 50(1), p. 23-27, [searched on Jul. 1, 2019], Internet <URL http://microscopy.or.jp/jsm/wp-content/uploads/publication/kenbikyo/50_1/pdf/50-1-23.pdf>

DISCLOSURE OF THE INVENTION

Problem to be Solved by the Invention

Although measurement ability of microscopic spectroscopes has improved, more spectra data become the target of a detailed analysis technique such as multivariate analysis as the number of measurement points in the measurement region that contains the foreign matter increases. In order to subject such enormous amount of spectra data to the detailed analysis technique, a memory capacity of an arithmetic element of a computer needs to be increased, or an arithmetic element having a faster processing speed needs to be implemented; therefore, the microscopic spectroscope becomes very expensive, and it was problematic.

The object of the present invention is to provide a method of analyzing foreign matter capable of suppressing a memory usage range of an arithmetic element and shortening time required for foreign matter analysis compared to a case when all of the measured spectra data are used for foreign matter analysis in an analysis method of measuring the spectra of the numerous measurement points on the measurement target to execute foreign matter analysis based on these spectra.

Means to Solve the Problem

The present inventors made the computer for processing the spectra data to calculate a feature value of the spectrum with a relatively short calculation time, and determine whether the measurement point of the measured spectrum should be a target of foreign matter analysis or not. That is, if the measurement point is set onto any foreign matter, the feature value of the spectrum of that measurement point is different from the feature value of the spectrum of the measurement target itself; therefore, by comparing both features, the spectrum of the measurement point that corresponds to the foreign matter can be extracted from the measurement region.

It is especially preferred to use a total area of the spectrum, correlation (degree of similarity) to a reference spectrum, or a peak wavenumber value by comparing with a standard deviation spectrum as the feature value of the spectrum; however, other than the above, a peak height, a peak area, a shift amount of a peak, a full width at half maximum, or the like can also be used. Moreover, the spectral data of the measurement points that did not become the target of foreign matter analysis may be deleted, or be moved to another place for storing data to be stored thereby being attached with flags that are distinguishable from the spectral data of the analysis target.

That is, a method of analyzing foreign matter in a measurement target comprises:
partitioning a measurement region on the measurement target into a plurality of measurement points and measuring an optical spectrum for each of the plurality of measurement points;
calculating a feature value of each measured spectrum;
determining whether each of the measurement points is on the foreign matter or not based on the feature value;
retaining the spectrum of the measurement point that is determined to be on the foreign matter, and deleting the spectrum of the measurement point that is not determined to be on the foreign matter or storing the same to a storage unit; and
analyzing foreign matter based on spectra of the plurality of measurement points that are determined to be on the foreign matter, in more detail than in the calculation of the feature value.

The analyzing foreign matter in more detail includes analysis techniques of: multivariate analysis that extracts a principal component of the spectra data of the plurality of measurement points that are determined to be on the foreign matter; spectrum data search that identifies constituents of the foreign matter; spectrum classification based on machine learning; prediction of constituents based on machine learning; obtaining an accurate distribution state for each constituents of the foreign matter; or a combination thereof, for example.

In this method, it is preferred that the feature value is compared with a certain threshold to determine whether each of the measurement points is on the foreign matter or not.

In this method, it is preferred that a total area of the spectrum, a value that shows correlation to a reference spectrum (e.g., Euclidean distance, a correlation coefficient, a sum of an absolute value of a difference, a sum of squares of a difference, etc.), a peak wavenumber value by comparing with a standard deviation spectrum, or a numerical value that corresponds thereto is calculate as the feature of the spectrum.

In this method, it is preferred that calculation of the feature value, determination of whether the measurement point is on the foreign matter or not, retention of the spectrum of the measurement point that is determined to be on the foreign matter, and deleting or storing of the spectrum of the measurement point that is not determined to be on the foreign matter are sequentially repeated during measurement of the optical spectrum.

In this method, it is preferred that, when the storage unit stores the spectrum, the spectrum of the measurement point that is not determined to be on the foreign matter is stored distinguishably from the spectrum of the measurement point that is determined to be on the foreign matter.

In this method, a timing of retaining the spectrum is preferably a timing when a group of the measurement points that are determined to be on the foreign matter becomes surrounded by the measurement points that are not determined to be on the foreign matter (closed state), and the group of the spectra of the measurement points that are determined to be on the foreign matter is preferably retained as a data group that represents one foreign matter.

In this method, it is preferred that the optical spectra of the plurality of measurement points are detected simultaneously with a multi-channel detector that can detect lights from the plurality of measurement points separately.

In this method, it is preferred that the retention of the spectrum includes; regarding the measurement points that are determined to be on the foreign matter and are adjacent to each other as one group,
calculating an average spectrum based on spectra of the measurement points included in the group, and
retaining the average spectrum as the spectrum of the measurement point that is included in the group, and
the average spectra are used to analyze the foreign matter.

In this method, it is preferred that, after determining whether the measurement points are on the foreign matter or not,
at least a part of the measurement points that are determined to be on the foreign matter is subjected to remeasurement;
at least one of measurement conditions (i) to (v) is changed;
(i) a wavelength of an irradiation light to the measurement point (making into a long wavelength, etc.);
(ii) a condition of an exposure time or the number of integration times;
(iii) an irradiation range of the irradiation light to the measurement point (line irradiation, point irradiation, etc.);
(iv) a type of a detector that detects the light from the measurement point;
and
(v) a type of an aperture disposed at any position on an optical path from the measurement point to the detector,
the optical spectrum of the measurement point that is subjected to remeasurement is remeasured at S/N ratio higher than before change of the measurement condition; and
the remeasured spectra are used to analyze the foreign matter.

In this method, it is preferred that, when measuring optical spectra, the optical spectra of the plurality of measurement points are detected simultaneously with a multi-channel detector that can detect lights from the plurality of measurement points separately, and
when remeasuring optical spectra, at least the shape of the hole of the aperture is changed, and the multi-channel detector is changed to a single-channel detector to detect the optical spectrum of one measurement point.

In this method, it is preferred that, the optical spectrum of the measurement point is remeasured in a case when S/N ratio of the previous spectrum of the measurement point that is determined to be on the foreign matter is lower than a standard value.

In this method, it is preferred that the case when S/N ratio is lower than the standard value is a case when a total area of the spectrum is above a predetermined size.

This method further comprises identifying the constituents of the foreign matter with a spectrum search program using a database.

A non-transitory computer-readable storage medium stores a program for foreign matter analysis that makes a computer to execute the above-identified method.

Moreover, an apparatus for analyzing foreign matter in a measurement target comprises:
a spectral measurement unit that partitions a measurement region on the measurement target into a plurality of measurement points, and is capable of measuring an optical spectrum for each of the plurality of measurement points;
a foreign matter determination unit that calculates a feature value of each measured spectrum to determine whether each of the measurement points is on the foreign matter or not based on each feature value;
a data retention controller that retains the spectrum of the measurement point that is determined to be on the foreign matter, and deletes the spectrum of the measurement point that is not determined to be on the foreign matter or stores the same to a storage unit; and
a foreign matter analyzing unit that analyzes the foreign matter based on spectra of the plurality of the measurement points that are determined to be on the foreign matter, in more detail than in calculation of the feature values.

As the spectral measurement unit, a microscopic spectroscope that irradiates light to a measurement target to measure an optical spectrum of transmission light, reflected light, scattering light, or fluorescence (such as Raman spectrometer, infrared spectrometer, ultraviolet-visible spectrophotometer, spectrofluorometer, etc.) can be employed.

Effect of the Invention

According to the above-identified foreign matter analysis method of the present invention, a foreign matter is not analyzed with all of the measured spectra data. It is effectively determined whether the measuring point should be a target of foreign matter analysis or not based on a feature value of each measured spectrum, and the foreign matter is analyzed based on the spectra data of the measurement points that are determined to be the analysis target. That is, the analysis target is limited to the spectra data of the measurement points set on the foreign matter contained in the measurement target. Therefore, compared to a case when the foreign matter is analyzed with all of the measured spectra data, a memory usage range of an arithmetic element can be suppressed, and time required for foreign matter analysis can be shortened.

BRIEF DESCRIPTION OF DRAWINGS

FIG. 5 is to explain types of the features used for determination.

FIG. 6 is to explain an averaging processing.

FIG. 17 is a second diagram showing specific examples of each procedure of FIG. 15.

MODE FOR CARRYING OUT THE INVENTION

First Embodiment

Foreign matter analysis method that is a first embodiment of the present invention is described below with reference to FIG. 1 to FIG. 6.

Figure 1:
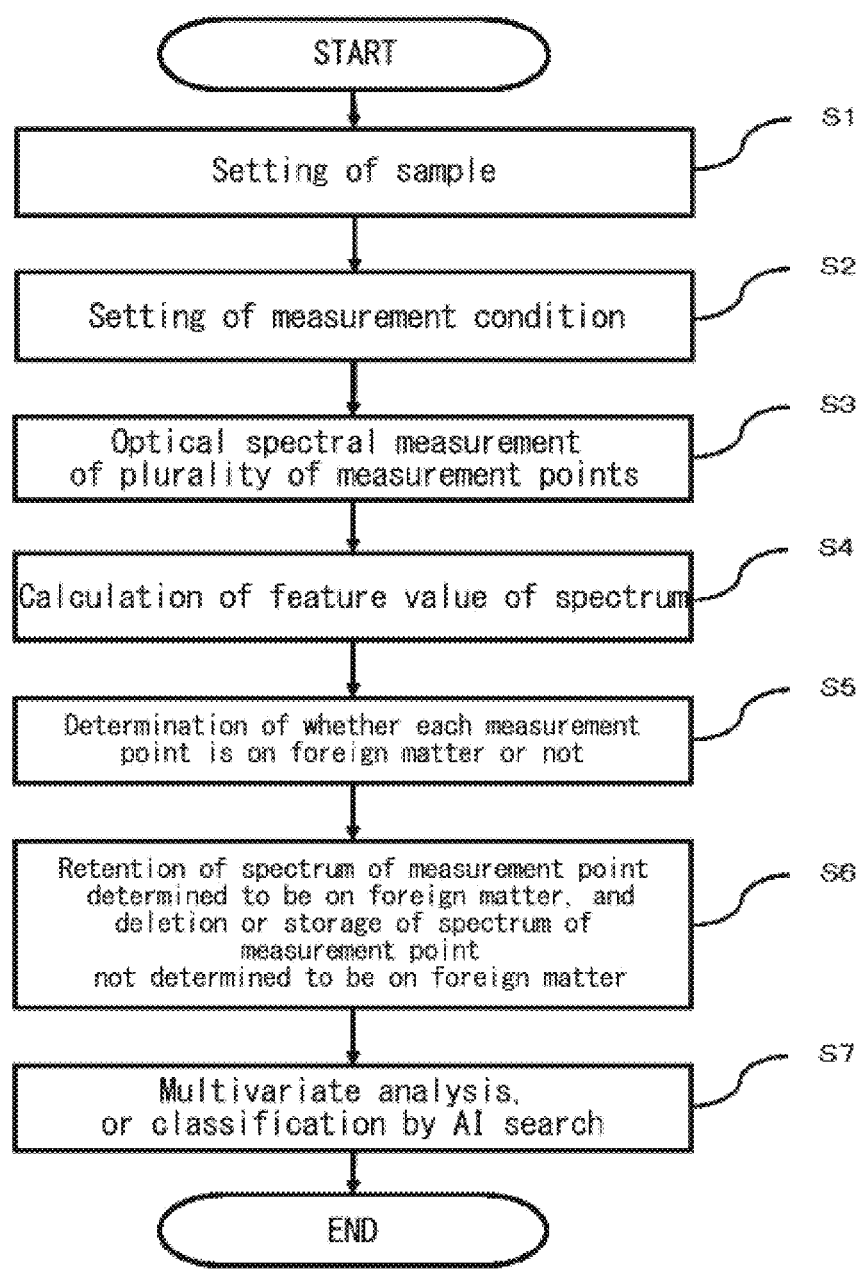
FIG. 1 is a flow diagram of a foreign matter analysis method according to a first embodiment.

Based on a procedure flow of FIG. 1, an overview of the foreign matter measurement method that is the first embodiment of the present invention is described. A sample that is a measurement target is set on a sample stage (step S1), and various measurement conditions such as setting of a plurality of measurement points on the sample are set (step S2). When measurement preparation is completed, measurement of an optical spectrum of each of the measurement points is started (step S3). With respect to a measured spectrum, a feature value for each measurement point is calculated by using an arithmetic processor 30 (step S4), and it is determined whether each measurement point is on a foreign matter or not based on the feature value (step S5). Then, the spectrum of the measurement point that is determined to be on the foreign matter is kept retained, and the spectrum of the measurement point that is not determined to be on the foreign matter is deleted or stored in a storage unit 40 (step S6). Multivariate analysis or classification by AI search is executed to the spectra data retained by the arithmetic processor 30 (step S7). Here, classification by AI search (artificial intelligence search) is an analysis technique that uses a program that has learned by machine-learning based on numerous spectra data to predict to what kind of substance group an unknown spectrum belongs.

Figure 2:
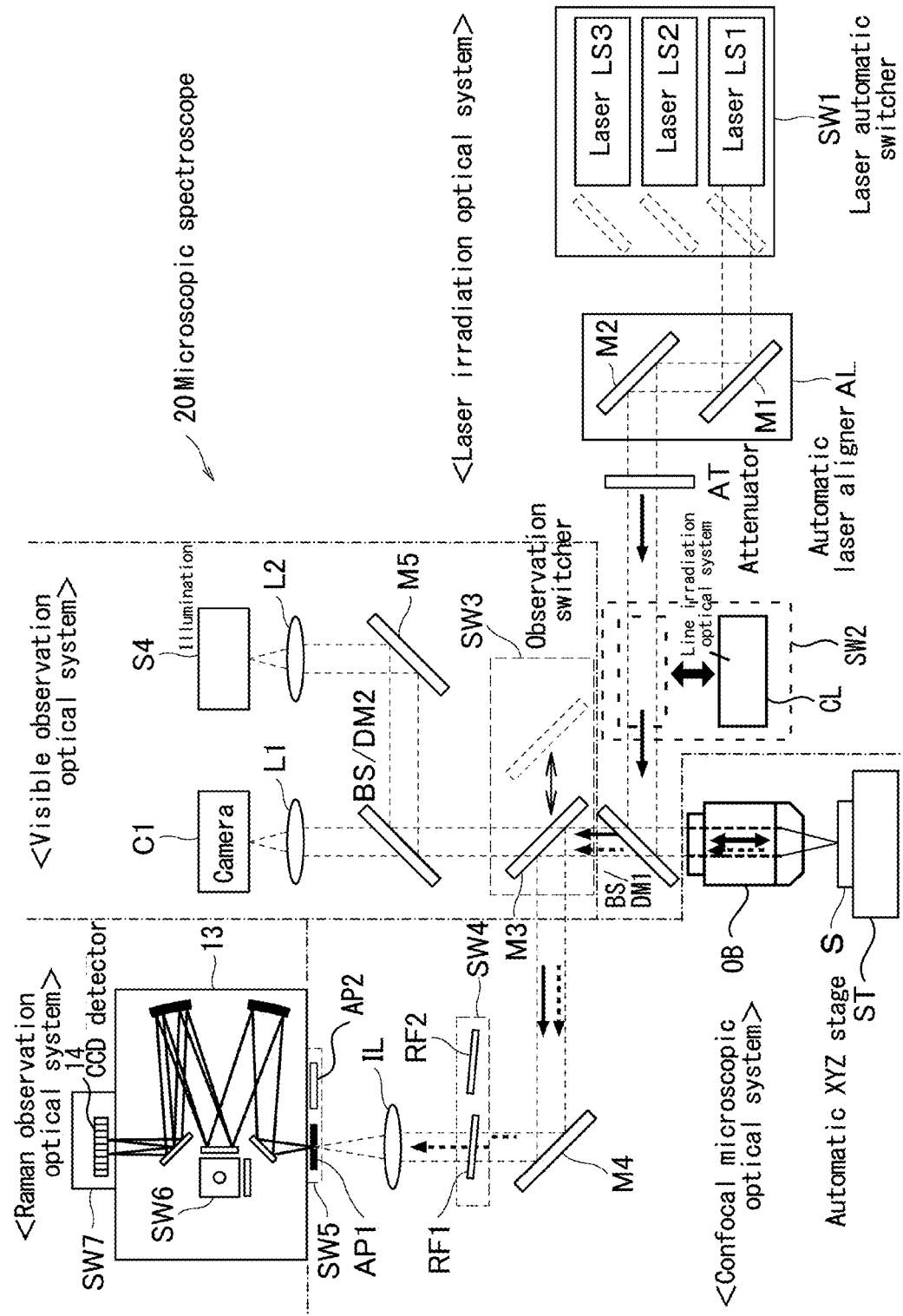
FIG. 2 shows a configuration of a microscopic spectroscope used in foreign matter analysis of FIG. 1.

A configuration of the microscopic spectroscope 20 used in foreign matter measurement of the present embodiment is described with FIG. 2. A configuration of a microscopic laser Raman spectrometer is shown as a specific example. The microscopic spectroscope (spectral measurement unit) 20 and the arithmetic processor 30 to be described later constitute the foreign matter analysis apparatus.

The microscopic spectroscope 20 is an apparatus that spectrally detects Raman scattering light from a sample S that is generated upon irradiation of laser light to obtain a spectrum. In addition, it can produce mapping data (also referred to as a spectral image) based on the spectra obtained from the plurality of measurement points, and is suitable for a two-dimensional or three-dimensional mapping measurement of a wide range.

A laser irradiation optical system, a confocal microscopic optical system, a Raman observation optical system (corresponds to a spectral detection system), and a visible observation optical system of the microscopic spectroscope 20 are described separately for convenience.

The laser irradiation optical system of the microscopic spectroscope 20 comprises: a laser device LS1; a pair of automatic alignment mirrors M1, M2 set to an automatic laser aligner AL; a light attenuator AT; a switcher SW2 to a line irradiation optical system; and a beam splitter BS/DM1. Here, the laser device LS1 may be set to a laser automatic switcher SW1 together with laser devices LS2, LS3 having different excitation wavelengths as in FIG. 2.

The line irradiation optical system for switching a spot-shaped beam into a line-shaped beam (e.g., cylindrical lens CL) is set to the switcher SW2 of the line irradiation optical system such that it can be switched online or offline.

The irradiation light (laser beam) from the selected laser device is subjected to optical-axis adjustment by the automatic laser aligner AL and light-intensity adjustment by the light attenuator AT, and passes through the switcher SW2 of the line irradiation optical system to enter the beam splitter BS/DM1. The beam splitter BS/DM1 reflects the irradiation light to an objective lens OB, and transmits the Raman light from the objective lens OB.

When the switcher SW2 of the line irradiation optical system moves the cylindrical lens CL online, the cylindrical lens CL and the objective lens OB as a combination make the irradiation light to form an elongated linear image, i.e., a line irradiation region, on the sample. When the cylindrical lens CL is moved to be offline, the irradiation light having a circular cross-section forms a beam spot on the sample. Such switcher SW2 enables to switch between a line-mapping measurement and a point-mapping measurement smoothly. As a technique of forming the line irradiation region other than the above, a technique of using a beam-scanning typed beam-shaping device and a galvanometer mirror to move the spot position on the sample by the laser light having a circular cross-section at high speed can be adopted.

The confocal microscopic optical system of the microscopic spectroscope 20 comprises: an automatic XYZ stage ST; the objective lens OB; a pair of mirrors M3, M4 for changing an optical path of the Raman light; a rejection filter automatic switcher SW4; an imaging lens IL; and a confocal aperture switcher SW5 in front of a spectrometer.

The Raman light from the sample S condensed by the objective lens OB transmits the beam splitter BS/DM1, and is guided to the rejection filter automatic switcher SW4 as a parallel light flux by the pair of mirrors M3, M4. Among a plurality of rejection filters (also referred to as band-blocking filters; e.g., RF1, RF2 in the drawing) set to the rejection filter automatic switcher SW4, only the light that passed the selected filter is guided to the imaging lens IL. At least one each of a slit-typed aperture AP1 and a pinhole-typed aperture SP2 is set to the confocal aperture switcher SW5, and an aperture having a size and shape selected in accordance with the measurement condition and the shape of the foreign matter is positioned to an imaging plane of the imaging lens IL.

The Raman observation optical system of the microscopic spectroscope 20 comprises a spectrometer 13, and a CCD detector 14. A grating automatic switcher SW6 that can switch gratings may be provided to the spectrometer 13. A detector automatic switcher SW7 that can switch to a suitable detector from CCD detectors of different sensitivity bands may be provided to the CCD detector 14. By switching to an EMCCD detector imparted with an electron multiplying function, a weak-light measurement can be performed with a higher speed.

The visible observation optical system of the microscopic spectroscope 20 comprises: an observation switcher SW3 that makes the mirror M3 offline; a beam splitter BS/DM2; a lens L1; an observation camera C1; a mirror M5; a lens L2; and an irradiation light source S4.

Figure 3:
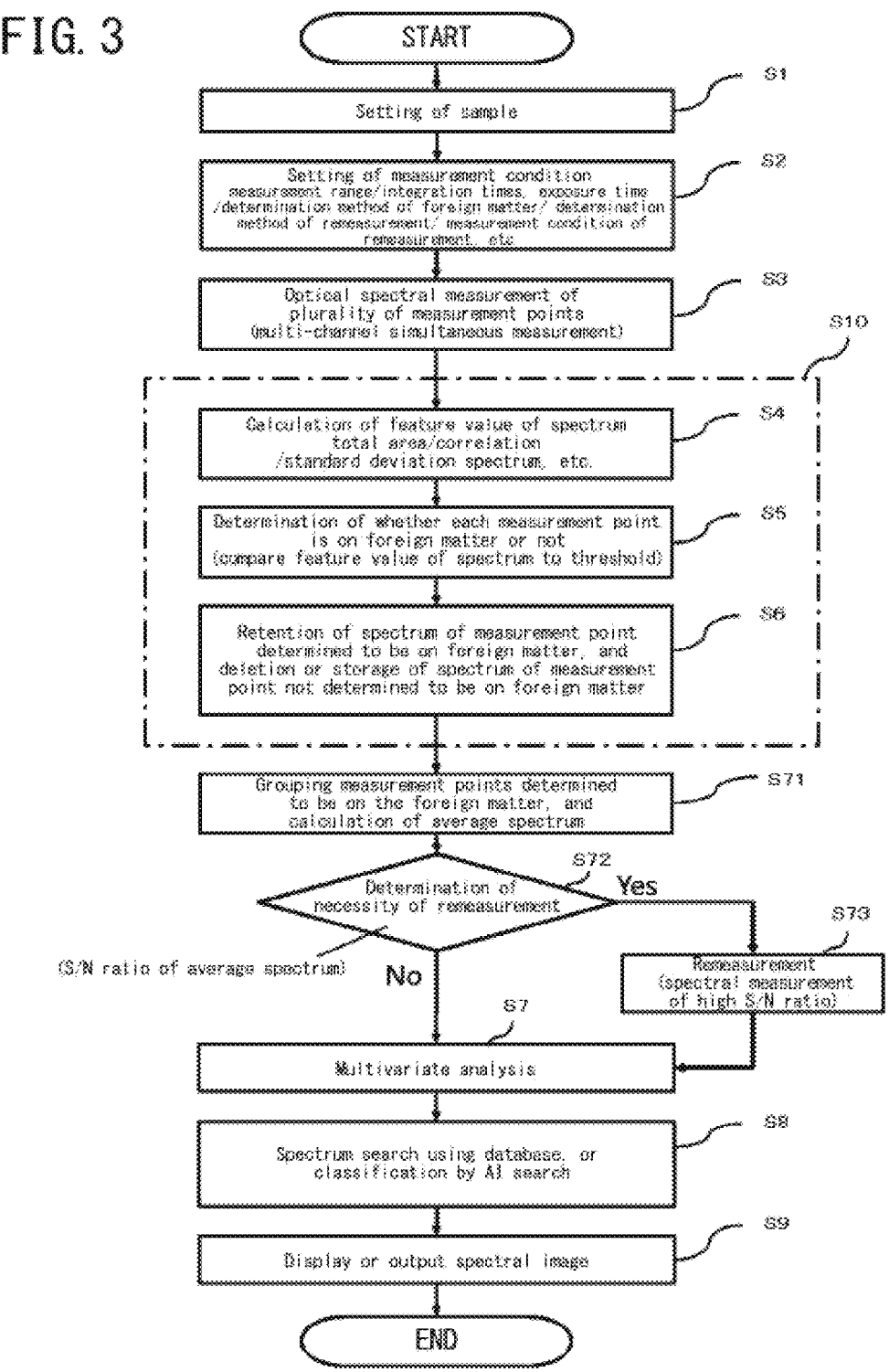
FIG. 3 is a flow showing a specific example of foreign matter analysis of FIG. 1.

Next, a foreign matter analysis program executed by the arithmetic processor 30 is described with FIG. 3. When the program is executed, it is determined whether the sample S is set properly to the stage ST (step S1). Moreover, a setting screen of measurement condition is displayed on a monitor unit 50 (step S2). The measurement conditions to be set are: selection of various optical elements that are configured to be switchable in the microscopic spectroscope 20; a measurement range; the number of integration times; an exposure time; a determination standard of the foreign matter; a determination standard of remeasurement; measurement condition of remeasurement; and the like.

When these measurement initiation conditions are satisfied, automatic measurement of the optical spectra of the plurality of measurement points is started (step S3). In measurement of the optical spectra, the element CL of the line irradiation optical system is disposed on the optical path, so that a line irradiation is executed on the sample S. The line irradiation is a manner of irradiating the plurality of measurement points disposed linearly at once, and the number of measurement points corresponds to the number of channels of the CCD detector. Or, the element CL of the line irradiation optical system is removed from the optical path to execute point irradiation on the sample, and the sample stage ST is moved at high speed, so that the point irradiation sequentially irradiates the plurality of measurement points disposed linearly at high speed. In either way, the spectra data of the plurality of measurement points are measured simultaneously (multi-channel simultaneous measurement) in the CCD detector.

Next, extraction of the spectra data on the foreign matter is executed (step S10). In this extraction step S10, the feature value of the spectrum of each measurement point is calculated (step S4). In the present embodiment, a total area of the spectrum, a value showing correlation to the reference spectrum, a peak wavenumber value by comparing with the standard deviation spectrum, or a numerical value that correspond thereto is calculated as the feature value.

The reference spectrum indicates a spectrum that shows original components of the sample. As the value showing correlation thereto, for example, Euclidean distance, a correlation coefficient, a sum of an absolute value of a difference, sum of squares of a difference, or the like can be used.

Next, a certain threshold set as the determination standard of the foreign matter is used to compare the feature value of the spectrum to the threshold, and it is determined whether individual measurement point is on the foreign matter or not (step S5). The spectrum of the measurement point that is determined to be on the foreign matter is kept retained, and the spectrum of the measurement point that is not determined to be on the foreign matter is deleted or stored in the storage unit 40 (step S6).

Extraction of the spectra data of the measurement points that are determined to be on the foreign matter among the spectra data of all the measured measurement points is completed by the above steps S4 to S6.

Grouping of the measurement points may be executed to the extracted spectra data to calculate the average spectrum for each group (step S71).

Moreover, necessity of remeasurement may be determined for each measurement point based on the measured spectrum (step S72). Here, a case when S/N ratio of the spectrum is low can be set as a requirement for remeasurement. For example, in a case when the total area of the spectrum is larger than a certain threshold (when influence of the fluorescence emitted by the sample S is large), remeasurement may be executed. In remeasurement, the measurement condition is changed to one such that the spectrum having a high S/N ratio can be measured, and an optical spectral measurement may be executed (step S73).

Since the spectra data of many measurement points can be obtained at once in the technique of the multi-channel simultaneous measurement, it is suitable for measuring a wide range of the sample S at high-speed. On the other hand, since high-speed measurement is assumed, there are many cases that the exposure time or the number of integration times is set to a small value. Accordingly, S/N ratio of the spectrum to be obtained becomes relatively low. Therefore, by the above-identified remeasurement of the step S73, the spectra data having a high S/N ratio are measured only from the measurement points that are determined to be on the foreign matter to improve analysis accuracy of the spectra data.

Next, multivariate analysis is executed to the spectra data of only the measurement points that are determined to be on the foreign matter or the average spectra thereof (step S7). Furthermore, spectrum search using a database is executed to the result of multivariate analysis (step S8), and the spectral image having the analysis result reflected thereto is displayed to the monitor unit 50. Or, the spectral image is output externally (step S9). Foreign matter analysis is completed. Classification by AI search (step S8) may be executed to the spectrum of the principal component obtained in multivariate analysis (step S7) to obtain information of the group to which the foreign matter belongs.

Figure 4:
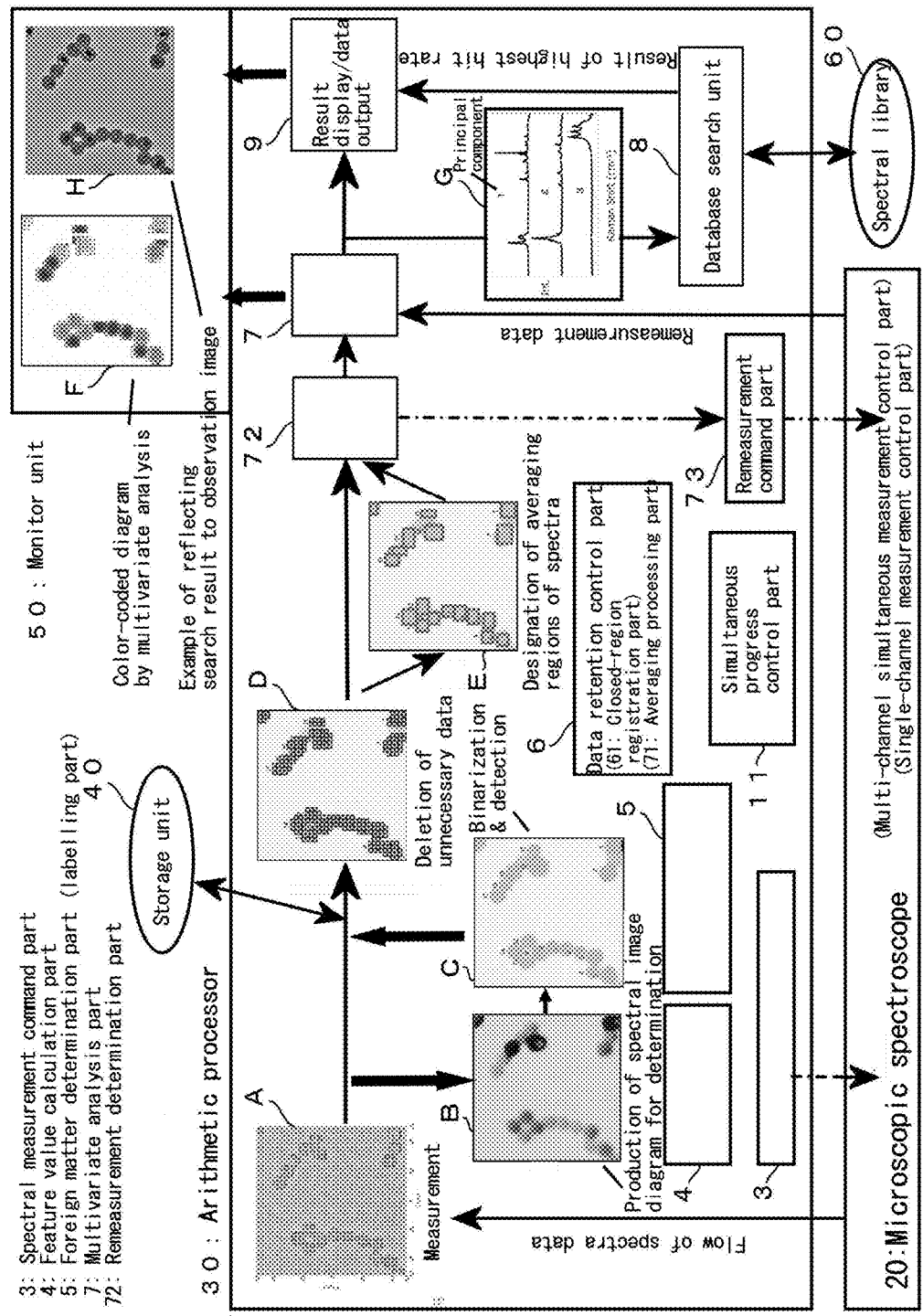
FIG. 4 shows a configuration of an arithmetic processor used for foreign matter analysis of FIG. 1.

Foreign matter analysis by the foreign matter analysis program is further described with a flow of processing of the spectra data shown in FIG. 4. A spectral measurement command part 3 of the arithmetic processor 30 commands the microscopic spectroscope 20 to execute the optical spectral measurement at a predetermined measurement condition (e.g., multi-channel simultaneous measurement condition).

The arithmetic processor 30 receives the spectra data from the microscopic spectroscope 20. Here, in order to make explanation easier to understand, a case of producing a spectral image of the sample to which micro particles having a diameter of about 5 to 10 μm are mixed as the foreign matter is described. First, the image A shows a square measurement region having a length and width of 100 μm set on the sample, and alignment of the measurement points partitioned into 40 boxes vertically and horizontally therein. For convenience, the boxes are overlapped onto the observation image that imaged distribution of the foreign matter in the image A. As a result of the optical spectral measurement, the spectrum of each box (each measurement point) is input to the arithmetic processor 30.

A feature value calculation part 4 produces a spectral image for determination (color-coded diagram) like the image B based on all the spectra data of the measurement region of the image A. Since the components of the sample itself that is a base material are uniform, the region of the color of the largest area in the image B is regarded as the sample, and the region of the color other than the above is regarded as the foreign matter. Next, a foreign matter determination part 5 binarizes each datum of the image B by a threshold, and parts that are determined to be the foreign matter are detected. Moreover, labelling for each solid body of the foreign matter may be executed based on predicted shapes of the foreign matter. A binarized image produced by this foreign matter determination part 5 is shown in the image C.

Next, a data retention control part 6 retains the spectra data of the measurement points that overlap the detected foreign matter, and deletes the spectra data of other measurement points as unnecessary data; or, instead of deleting, moves to the storage unit 40 to store the same. That is, the data retention control part 6 executes a processing of leaving only the measurement points that correspond to parts of the foreign matter when the image A and the image C are overlapped. The image D shows a state of only the necessary measurement points are left.

The data retention control part 6 further includes a closed region registration part 61 and an averaging processing part 71 as optional functions. The image E shows a state where, to be described later in detail, averaging regions are designated by the averaging processing part 71. The averaging processing part 71 calculates an average spectrum for each averaging region.

Next, a remeasurement determination part 72 determines necessity of remeasurement based on the spectra data of the measurement point (image D) that are determined to be the foreign matter or the average spectrum of the averaging regions (image E). When remeasurement is necessary, a remeasurement command part 73 commands the microscopic spectroscope 20 to execute the optical spectral measurement at a predetermined remeasurement condition (e.g., single-channel measurement condition). In remeasurement, the measurement points that are determined to be on the foreign matter (image D) or these averaging regions (image E) are subjected to the optical spectral measurement for each one of the measurement points or the averaging regions at a high S/N ratio condition. The spectra data obtained in remeasurement are input to a multivariate analysis part 7.

When remeasurement is unnecessary, the multivariate analysis part 7 performs multivariate analysis to the spectra data of the measurement points that are determined to be the foreign matter (image D) or the average spectra data of these averaging regions (image E). When remeasurement is performed, the spectra data obtained by remeasurement are subjected to multivariate analysis. Here, a result of a principal-component analysis that is one of multivariate analysis is shown. The image G shows the principal-component spectra of the principal components 1 to 3. The image F is a diagram of which the measurement points of the image D are color-coded for each of the principal components 1 to 3, and is displayed on the monitor unit 50 by a result-display/data-output part 9. Or, the images are output externally. Not only the color-coded diagram (image F) of the result of multivariate analysis, but also images that show analysis progress (images A to G) may be displayed on the monitor unit 50 as necessary.

Furthermore, a database search unit 8 may use a search database such as a Spectral library 60 to search the respective principal-component spectrum (image G) of the principal components 1 to 3, and may identify the corresponding constituents. Moreover, classification by AI search may be executed instead of searching with the search database. The result-display/data-output part 9 can display a result having the highest hit rate on the monitor unit 50. The image H is an example of the image of which the component names identified by the database search unit 8 are color-coded and displayed at the position of the foreign matter imaged in the observation image.

FIG. 5 is an explanation diagram of various calculation methods of the feature value that can be adopted to the feature value calculation part 4, and determination spectral images that are obtained as a result thereof.

The total area of the spectrum is a numerical value that corresponds to the total area of the spectrum peaks in the measurement range of Raman shift (the colored range in the spectral diagram SP1 of FIG. 5). The image B1 is a diagram that is color-coded based on the total area, and the parts of the foreign matter are emerged from the sample S. This total area is effective when fluorescent components are contained in the foreign matter itself, and the foreign matter can be easily determined.

Moreover, determination of necessity of remeasurement using the total area is effective in the remeasurement determination part 72. For example, when fluorescence from the sample S itself or the foreign matter contained therein is too strong, the total area becomes larger, so that necessity of remeasurement can be determined by the numerical value of the total area. When fluorescence is strong, it can be easily determined whether the measurement condition should be changed to one that influence of fluorescence becomes small such as switching to the excitation laser having a different excitation wavelength or not, or the like.

Correlation of the spectrum is correlation between the spectrum of the measurement point and the reference spectrum (the spectrum of the sample itself), and a quantification processing of correlation by various calculation algorithms of such as Euclidean distance, a correlation coefficient, a sum of an absolute value of a difference, sum of squares of a difference, etc. can be selected as the calculation algorithm. The spectral diagram SP2 of FIG. 5 shows that the numerical value of correlation (degree of similarity)

between the spectrum of the foreign matter part and the reference spectrum becomes low. The image B2 is a diagram that is color-coded based on the numerical value, and the parts of the foreign matter are emerged from the sample S. Use of correlation of the spectrum is effective to a sample in which modification occurs to the spectrum at a state capable of obtaining the spectra of a constant intensity for the sample; the state such as the sample S being a substrate, or the like.

Next, the standard deviation spectrum is shown in the spectral diagram SP3 of FIG. 5. This spectral diagram SP3 of standard deviation contains information of the spectra data of all the measurement points. Therefore, the feature value calculation part 4 extracts a spectrum intensity value of the same wavenumber range from the spectrum of each measurement point to calculate standard deviation of these spectrum intensity values. The spectral diagram SP3 is displayed as the spectrum of standard deviation having the wavenumber as the horizontal axis and standard deviation of the calculated spectrum intensity value as the vertical axis. The standard deviation spectrum shows the degree of variation of the spectrum intensity values of each wavenumber. Then, the feature value calculation part 4 executes a well-known automatic peak detection unit to detect a peak of the standard deviation spectrum. The wavenumbers of the plurality of peaks (those having large peak values) detected from the spectral diagram SP3 of FIG. 5 are shown with arrows.

The image B3 is a color-coded diagram of which the positions of the measurement points are specified by the vertical and horizontal axes and produced based on the detected peak wavenumbers. Suitable methods of producing the color-coded diagram are described. The first method is to produce the color-coded diagram by image-processing a single-colored color-coded diagram for each of the detected peak wavenumbers. The feature value calculation part 4 compares the plurality of the single-colored color-coded diagrams as images, extracts the color-coded diagram (first peak wavenumber) of the largest contrast (or deviation), and designates red. Then, the feature value calculation part 4 extracts the color-coded diagram (second peak wavenumber) of the lowest degree of similarity to the extracted single-colored color-coded diagram, and designates green. In a similar manner, the feature value calculation part 4 extracts the color-coded diagram (third peak wavenumber) of the lowest degree of similarity to the single-colored color-coded diagram extracted as above from the rest of the color-coded diagrams, and designates blue. By overlapping the three single-colored color-coded diagrams (three peak wavenumbers) extracted as above, a color-coded diagram of three colors can be obtained. Color-coded diagrams of two colors or four or more colors can be produced similarly.

The second method is a method of: extracting the spectrum intensity value for each peak wavenumber of the standard deviation spectrum from the spectrum of each measurement point; correlating the spectrum intensity values of the two peak wavenumbers; and selecting a combination of suitable peak wavenumbers. To be more specific, the feature value calculation part 4 extracts the spectrum intensity values of the peak wavenumber 1 and the peak wavenumber 2 from the spectrum data of all measurement points, and correlates by plotting all measurement points as the spectrum intensity value of the peak wavenumber 1 on the vertical axis and as the spectrum intensity value of the peak wavenumber 2 on the vertical axis, respectively. When inclination of correlation becomes minus, it can be regarded as a combination of peaks of different components. Therefore, by correlating as described above for combinations of all peak wavenumbers, a combination of two or more peak wavenumbers that can be regarded as different components can be selected. In a similar manner as the above-described image-processing method, a suitable color-coded diagram can be obtained by overlapping the single-colored color-coded diagrams for the selected peak wavenumbers.

In a case when a plurality of types of foreign matters is mixed and determination with the total area or correlation is difficult (e.g., a boundary surface is not clear), a determination method using the standard deviation spectrum as described above becomes effective.

Next, actions of the averaging processing part 71 is described with FIG. 6. The averaging processing part 71 produces a group of adjacent measurement points for the measurement points (image D) that are determined to be on the foreign matter by the foreign matter determination part 5, and calculates the average spectrum based on the spectrua of the measurement points contained in the group (averaging region).

Here, grouping is performed with reference to a lump of foreign matters that is labeled by the foreign matter determination part 5. The averaging region of the image E is displayed with a rectangular shape that is larger than the measurement point of the image D. Therefore, distribution of the averaging regions designated by the averaging processing part 71 can be seen from the image E. Moreover, the spectrum SP61 of FIG. 6 shows a spectrum of any one of the measurement points that are determined to be on the foreign matter, and the spectrum SP62 shows the average spectrum of any one of the averaging regions after averaging processing. The spectrum data with less noise can be obtained by averaging.

Effect of the Present Embodiment

According to the foreign matter analysis method of the present embodiment shown in FIG. 1 to FIG. 6, not all of the measured spectra data are subjected to multivariate analysis, but it is effectively determined whether it should be the target of multivariate analysis or not based on the feature value of each measured spectrum (step S5), and only the spectra data of the measurement points that are determined to be the analysis target are subjected to multivariate analysis (step S7). That is, the analysis target is limited to the spectrum of the measurement point set on the foreign matter that is contained in the measurement target. Therefore, compared to a case when all of the measured spectra data are subjected to multivariate analysis, the memory usage range of the arithmetic element can be suppressed, and the time required for multivariate analysis can be shortened.

Moreover, as shown in the step S9 of FIG. 3, by displaying a distribution state for each constituent of the foreign matter as the two-dimensional or three-dimensional image based on the result of multivariate analysis or database search, a user can recognize the distribution state of the constituents of the foreign matter and how the property of the measurement target changes by the foreign matter at a glance.

Furthermore, in a case when a high-speed imaging is executed in the optical spectral measurement of the step S3, it is often that the exposure time or the number of integration times is made less, and the spectrum tends to be of low S/N ratio. As shown in the step S71 in the foreign matter analysis method of the present embodiment, when the size of the foreign matter is larger than the measurement area of one point, the spectra can be added and averaged to improve S/N ratio. In such case, the spectral image obtained in the optical spectral measurement of the step S3 can be subjected to image-processing to automatically set the areas of adding and averaging. A remeasurement step S73 and a multivariate analysis step S7 to be described later are techniques that can improve S/N ratio.

In a case of executing other techniques of foreign matter analysis (such as: classification by AI search; spectrum search using an existing database; prediction of constituents by AI search; obtaining of an accurate distribution state for each constituent, etc.) instead of multivariate analysis, or executing a plurality of these techniques in combination, the time required for analysis can be shortened similarly.

Second Embodiment

Figure 7A:
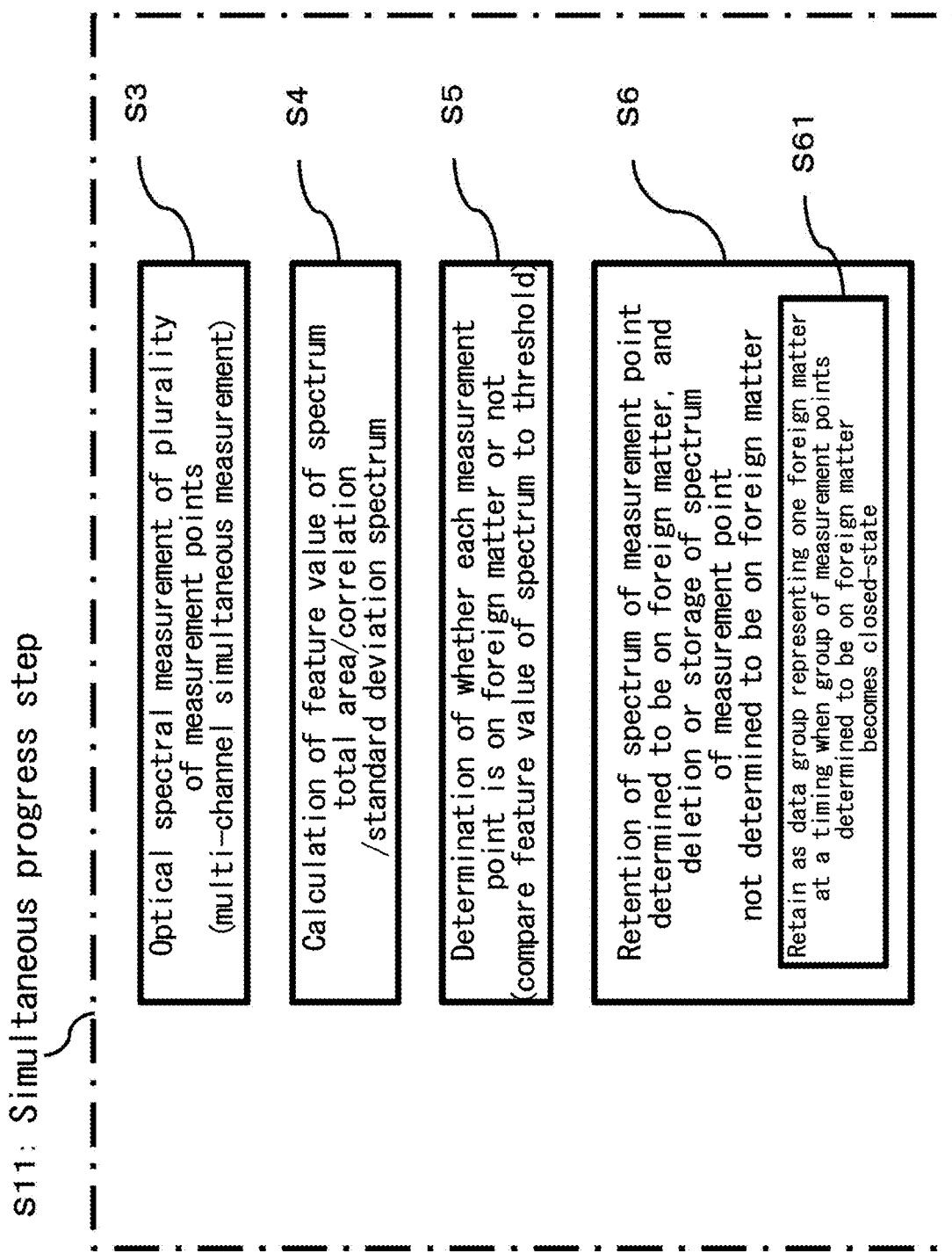
FIG. 7(A) is to explain a simultaneous progress step according to a second embodiment.

The foreign matter analysis method that is the second embodiment of the present invention is described with reference to FIG. 7A and FIG. 7B. Since this foreign matter analysis method is based on the procedure flow of FIG. 3, descriptions of the parts that are in common are omitted.

In the present embodiment, a simultaneous progress step S11 is added to the processing from the step S3 to the step S6 among the procedure flow of FIG. 3. The optical spectral measurement (S3), calculation of the feature value (S4), determination of whether it is on the foreign matter or not (step S5), and retention of the spectrum (S6) and the like are executed simultaneously in the simultaneous progress step S11.

This step S11 is described with a registration step (S61) of the closed region in the step S6. The registration step S61 of the closed region is a step of registering as a data group that shows one foreign matter at a timing when grouping of the measurement points that are determined to be on the foreign matter becomes a closed state.

Figure 7B:
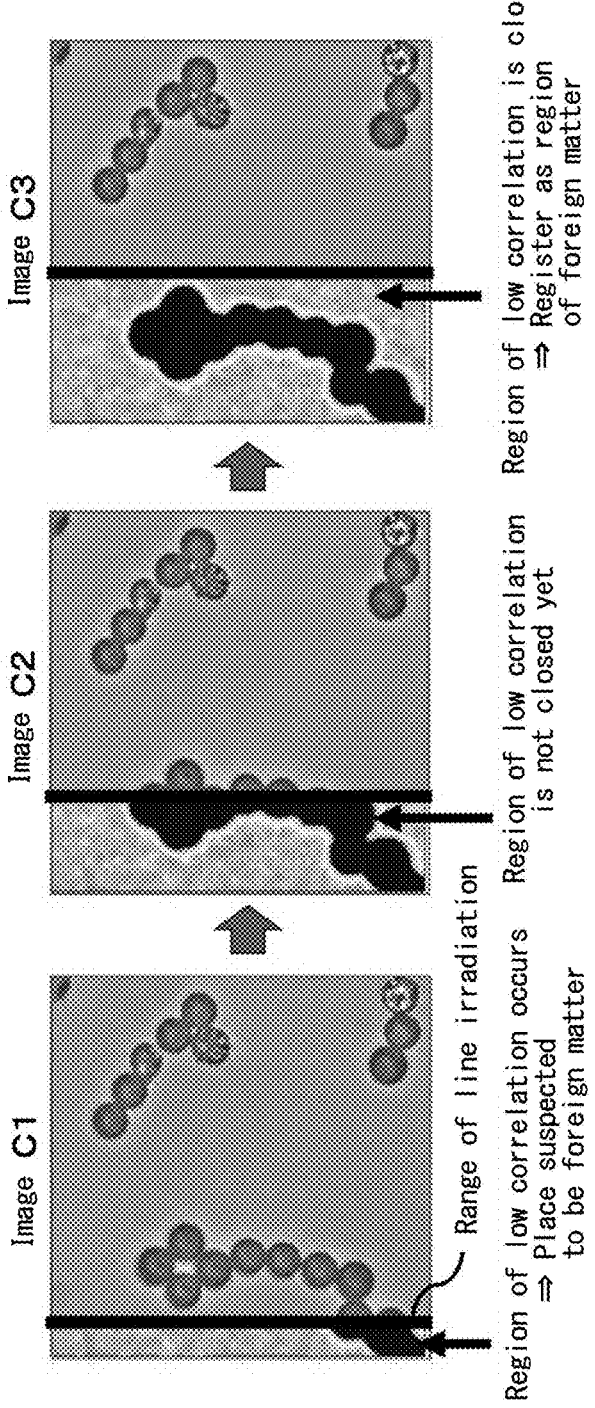
FIG. 7(B) is to explain a registration step of the closed region.

The images C1 to C3 of FIG. 7B schematically show a flow of data processing of when one line irradiation is moved from the left side of the measurement region to the right side at a predetermined speed. When the optical spectral measurement (S3) is started, the spectra data of one column of the measurement points that are within the range of line irradiation is obtained simultaneously. When the spectra data for one column are obtained, the line irradiation range proceeds to the next column. At the same time, the feature values of the obtained spectra data are calculated (S4), and it is determined whether the measurement point is on the foreign matter or not (S5). Moreover, it is determined whether the group of the measurement points that are determined to be on the foreign matter is has become a closed state or not (S6), and if it is not in a closed state yet, it proceeds to the next step as it is. If the spectra data for the second column are obtained during the steps S4 to S6, processing of the steps S4 to S6 are executed similarly. As described, the range of line irradiation gradually proceeds to the left side, and, at the same time, processing proceeds from calculation of the feature value of the obtained spectra data to determination of the closed state.

In the image C1, the measurement point that is determined to the on the foreign matter with correlation as the feature value is displayed by being filled with black. The region which is determined to be on the foreign matter is a region of which correlation to the reference spectrum (the spectrum of the sample itself) is low, and it can be seen that a place that is suspected to be the foreign matter appears in the first column.

When line irradiation proceeds as in the image C2, the accumulated amount of the obtained spectra data increases, and the region of low correlation gradually becomes larger; however, the region is not in a closed state at this timing. The closed state is a state when the region of low correlation becomes surrounded by the region of high correlation.

Furthermore, when line irradiation proceeds as in the image C3, the region of low correlation becomes a closed state at this timing. By the registration step (S61) of the closed region, the spectra data of the region which has become the closed state are registered as a data group that represents one foreign matter. Moreover, at the same timing, the spectra data of the measurement points that are not determined to be on the foreign matter are deleted or stored in the storage unit 40.

As described, during the optical spectral measurement, while a spectrum correlation of which the threshold of foreign matter detection is easily set is calculated, obtaining of data is continued. By performing a labeling processing while producing the image diagram of the spectrum correlation, and registering as the foreign matter when it becomes a closed state, it becomes unnecessary to keep retaining unnecessary spectra data.

Third Embodiment

The foreign matter analysis method that is the third embodiment of the present invention is described with reference to FIG. 8 to FIG. 10. This foreign matter analysis method is based on the procedure flow of FIG. 3, and descriptions that are in common are omitted.

The present embodiment is related to a determination step S72 of necessity of remeasurement and a remeasurement step S73 in the procedure flow of FIG. 3, and a specific method of optimization of the measurement condition of remeasurement is described. FIG. 8 shows differences between configurations of the optical elements in the optical spectral measurement (step S3) using a slit, and configurations of the optical elements in remeasurement (step S73) using a pinhole.

In the optical spectral measurement (step S3) using a slit, the element CL of the line irradiation optical system is inserted onto the optical path of the irradiation light from the excitation laser, so that a line-shaped beam is irradiated onto the sample S. The Raman light from the sample S reaches the confocal aperture AP1 in front of the spectrometer, and only the light that passed the slit is spectrally detected. The light that passed the slit is dispersed by a diffraction grating of the spectrometer 13 in a direction perpendicular to the longitudinal direction of the slit, and is imaged to a plurality of channels on the two-dimensional array typed CCD detector 14 to be detected.

That is, the Raman light from one column of measurement points in the irradiation range of the line-shaped beam passes through the slit, and becomes a dispersed light to be detected by the CCD detector 14, so that a plurality of spectra data corresponding to one column of measurement points can be obtained at once. Accordingly, a high-speed imaging becomes possible by a combination with the automatic XYZ stage ST that is a high-speed stage. FIG. 8 shows a multi-spectra data (SP1, SP2, . . . , SPx) to be obtained. Such optical spectral measurement is one pattern of a multi-channel simultaneous measurement.

On the other hand, in remeasurement (step S73) using a pinhole, the element CL of the line irradiation optical system is removed from the optical path of the irradiation light from the excitation laser, so that the irradiation light to the sample S is condensed to one point to become a point irradiation. The Raman light from the sample S reaches the confocal aperture AP 2 in front of the spectrometer. Only the light that passed the pinhole is dispersed by the diffraction grating of the spectrometer 13, and is detected by the two-dimensional array typed CCD detector 14; therefore, spatial resolution is high.

That is, the Raman light from one measurement point that is point-irradiated (it may be a measurement point larger than the measurement point in line irradiation) passes through the pinhole, and is detected as a spectrum for one channel at the CCD detector 14, so that the spectrum of one measurement point is obtained with a high spatial resolution. FIG. 8 shows a single spectrum (SP1) to be obtained. Such optical spectral measurement is also referred to as the single-channel measurement herein.

The action of inserting/removing the element CL of the line irradiation optical system to/from the optical path of the irradiation light and the action of switching from the slit to the pinhole are automatically switchable by the switcher SW2 of the line irradiation optical system shown in FIG. 2 and the confocal aperture switcher SW5.

In a case of a microscopic Raman spectroscope, a vertically-long slit is used as the confocal aperture in front of the spectrometer in a line irradiation optical system, and thus spatial resolution deteriorates compared to the pinhole. Thus, upon remeasurement (step S73), it is preferred to:
(1) switch from the line irradiation optical system to an optical system for point irradiation; and
(2) switch the confocal aperture from the vertically-long slit (AP1) to the pinhole aperture (AP2),
in order to improve S/N ratio of the spectrum as shown in FIG. 8. Moreover, it is also preferred to:
(3) change the measurement conditions such as the exposure time and the number of integration times; and
(4) change the excitation wavelength of the excitation laser when fluorescence of the sample itself is strong.

Figure 9:
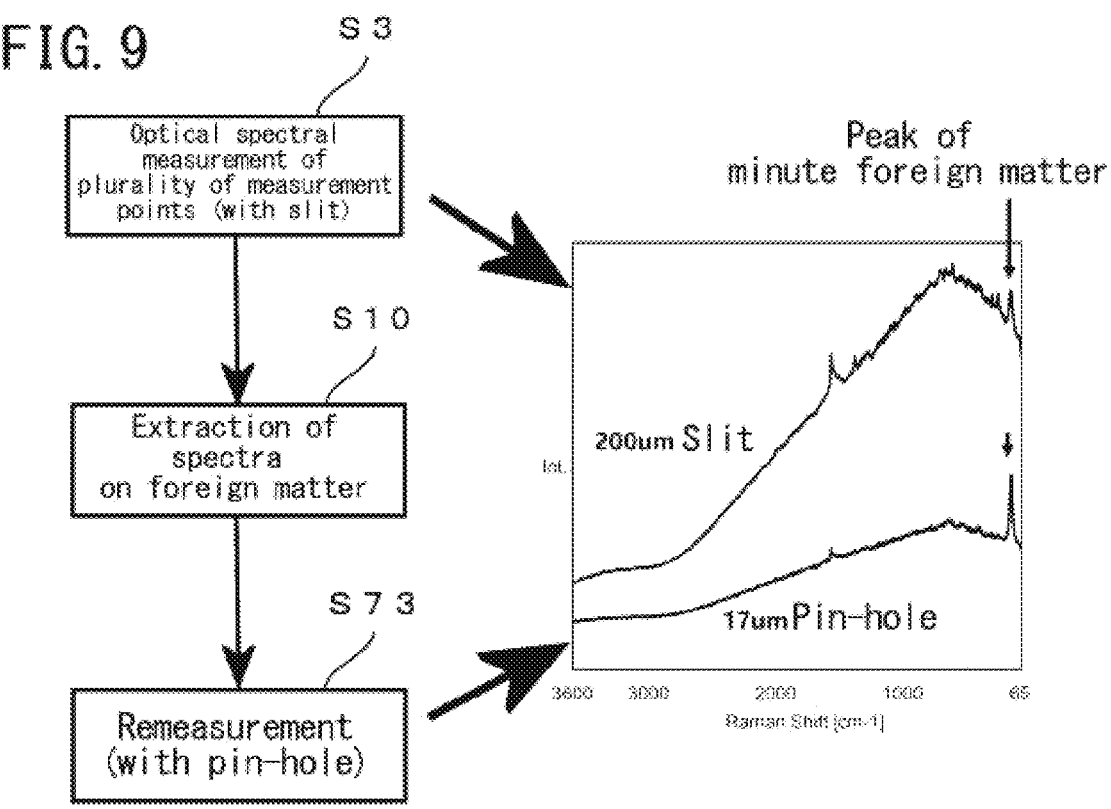
FIG. 9 shows spectra data of before and after switching a confocal aperture.

FIG. 9 shows the spectra data of the cases when the confocal aperture is 200 μm slit and when the confocal aperture is switched to 17 μm pinhole. Each of them is a spectrum of the measurement point on a foreign matter of when the foreign matter having a long side of about 5 to 10 μm is contained on an RGB color filter. With the slit, the baseline of the spectrum is high by fluorescence derived from the color filter, and the peak that shows the minute foreign matter is relatively low. Whereas, when it is switched to the pinhole, spatial resolution improves, the baseline becomes lower, and the peak of the minute foreign matter reaches a detectable level relatively.

Moreover, from the example of FIG. 9, it can be said that it is suitable to set the condition such that the total area is a certain threshold or more as the condition of determination of necessity of remeasurement when influence of fluorescence is suspected.

Figure 10:
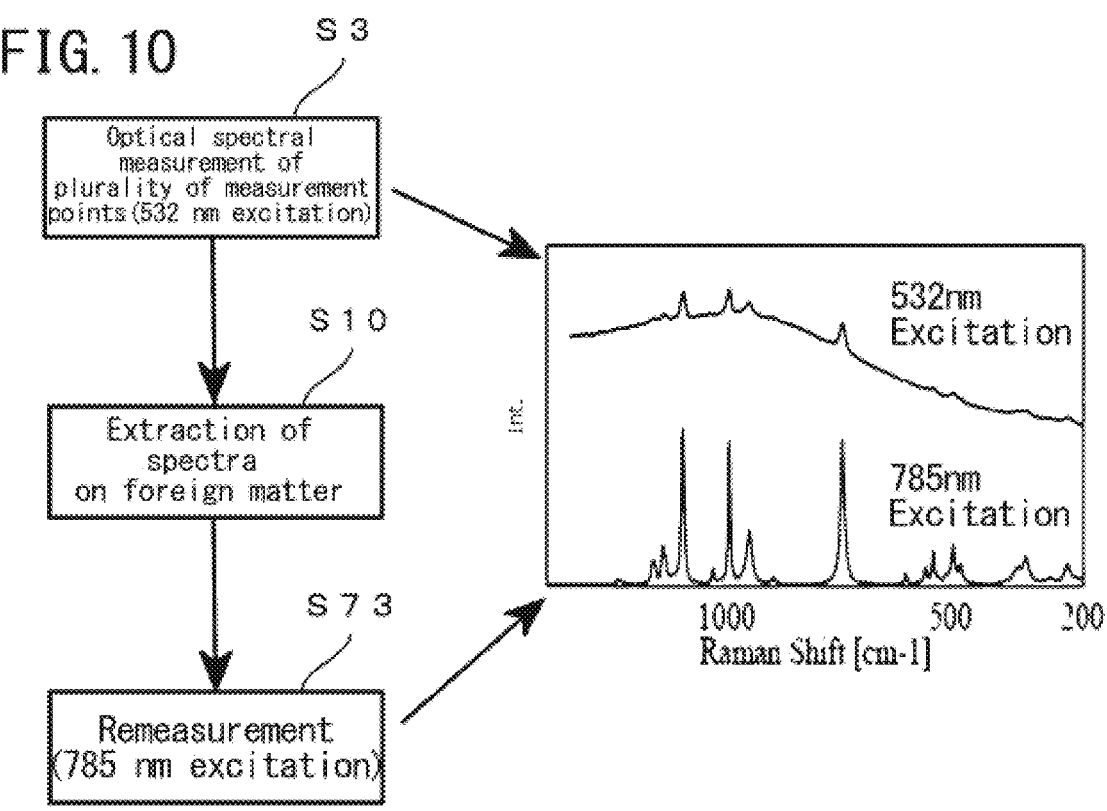
FIG. 10 shows spectra data of before and after changing an excitation wavelength.

FIG. 10 shows the spectrum of the cases when the excitation wavelength of the excitation laser is 532 nm and when the wavelength is changed to 785 nm. With 532 nm laser excitation, self-fluorescence of the sample is strong, and it may be difficult to obtain the spectrum of a good S/N ratio. This is an example to show that, by switching the excitation laser to 785 nm laser excitation, fluorescence can be avoided, and a good spectrum can be obtained.

Switching of the laser device, alignment-adjustment of the optical axis, switching of the rejection filter, and switching of the diffraction grating may be performed in accordance with the change of the excitation wavelength. The microscopic spectroscope of the present embodiment can automatically adjust and switch these optical elements by the laser automatic switcher SW1, the automatic laser aligner AL, the rejection filter automatic switcher SW4, and the grating automatic switcher SW6.

From the examples of FIG. 9 and FIG. 10, it can be said that it is suitable to set the condition such that the total area is a certain threshold or more as the condition of determination of necessity of remeasurement when influence of fluorescence is suspected.

Fourth Embodiment

Figure 11:
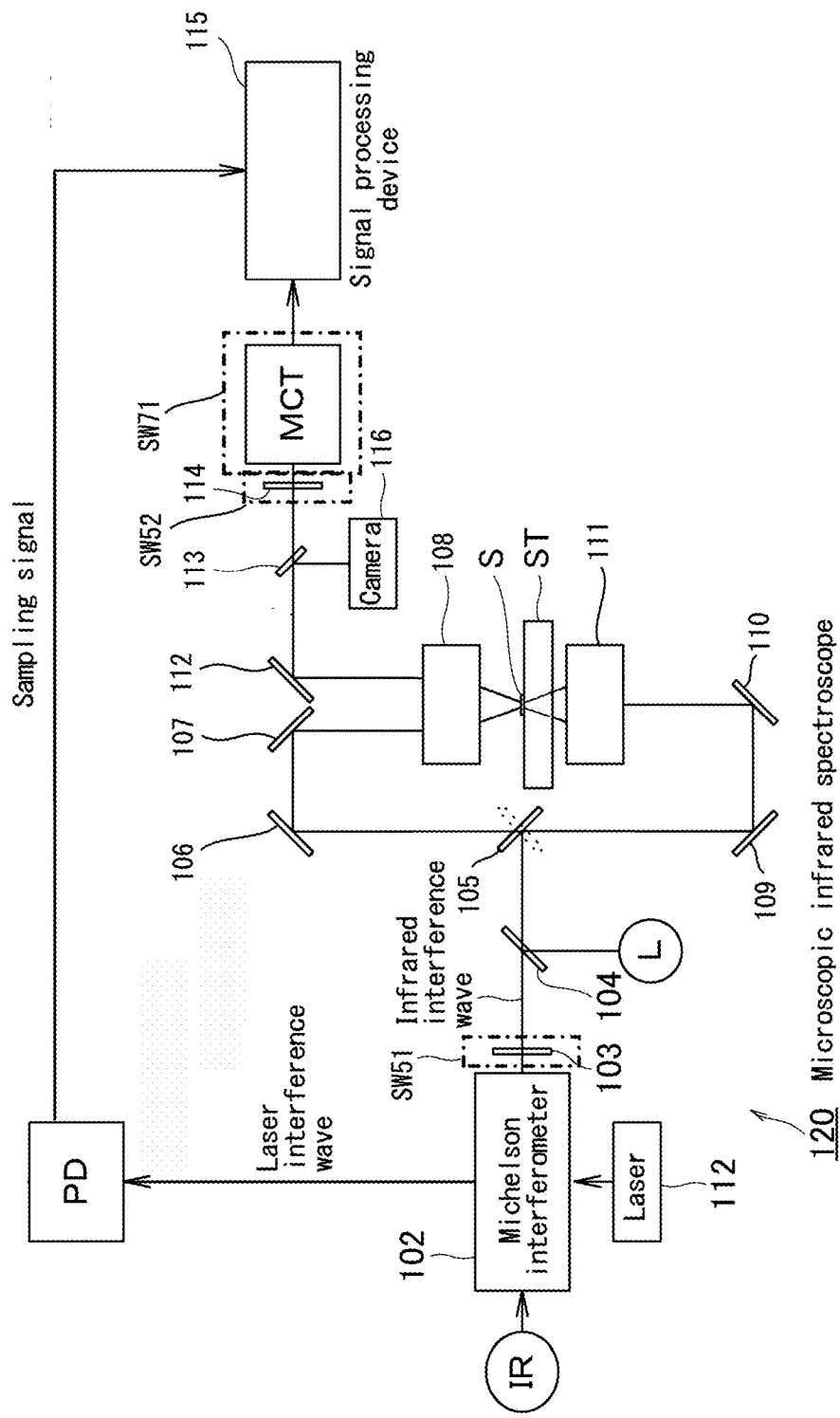
FIG. 11 shows a configuration of a microscopic infrared spectrometer according to a fourth embodiment.
Figure 12:
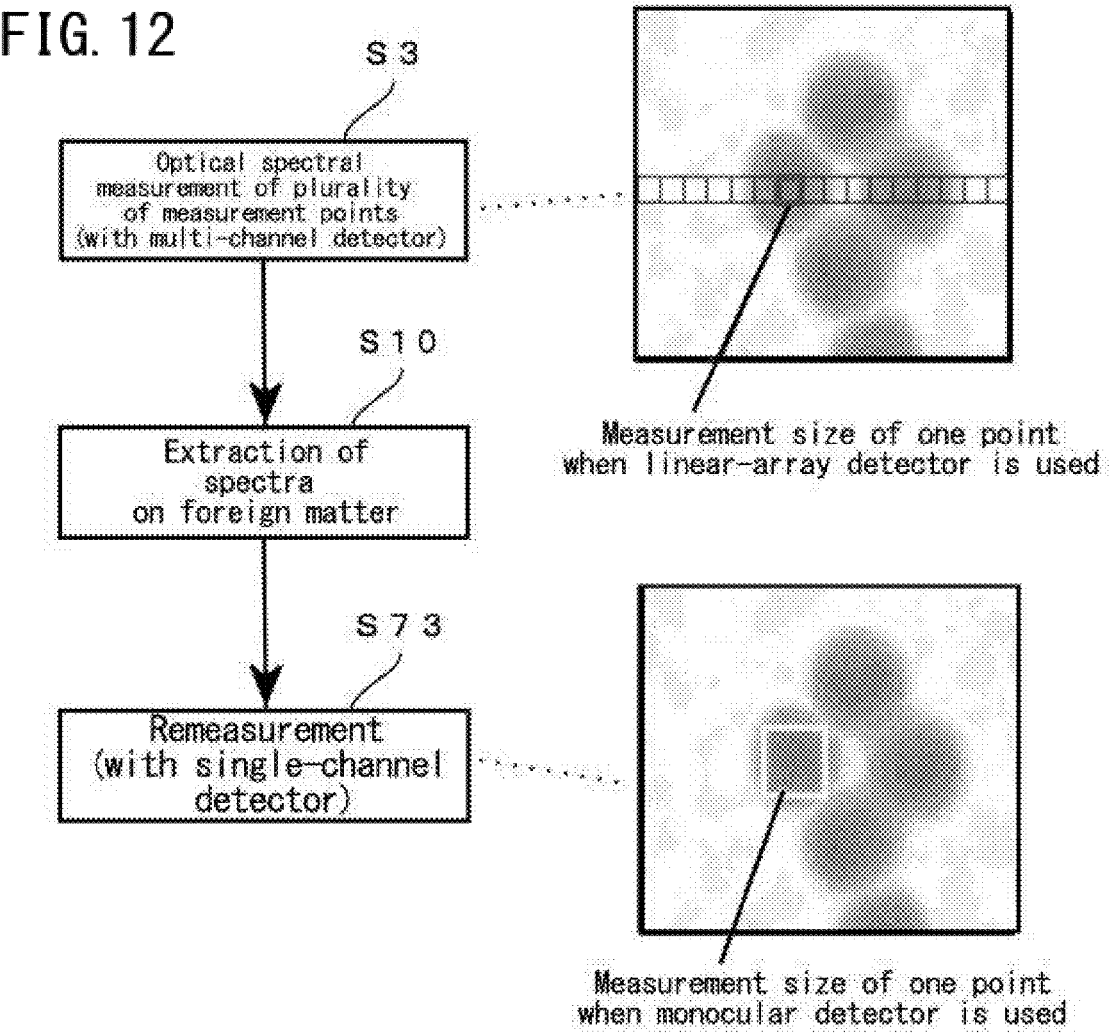
FIG. 12 is to explain optimization of the aperture in the apparatus of FIG. 11.

Next, a case of when foreign matter measurement of the above-described embodiments is executed with a Fourier transform microscopic infrared spectroscope is described with FIG. 11 and FIG. 12. The flow of the foreign matter analysis method and each function of the arithmetic processor are in common with the microscopic Raman spectroscope of FIG. 2.

FIG. 11 is an example of a configuration of a microscopic infrared spectroscope 120. When an infrared absorption spectrum of the measurement point on the sample S is measured with this microscopic infrared spectroscope 120, an infrared interference wave (measurement light) generated by an infrared light source IR and a Michelson interferometer 102 transmits an incoming-side aperture 103 and a semi-transparent mirror 104, and is made incident on a switching mirror 105. This switching mirror 105 is pivotable in 90 degrees, and it guides the incoming light to an optical path for reflection measurement in a posture before pivoting (shown with a broken line in the drawing). Moreover, in a posture after 90 degrees pivoting, it guides the incoming light to an optical path for transmission measurement.

In the optical path for reflection measurement, two fixed mirrors 106, 107 for guiding the incoming light that reflected the switching mirror 105 to an objective mirror 108 for reflection measurement disposed at an upper side of the stage ST are disposed. The incoming light irradiates the measurement point on the sample S via the objective mirror 108 for reflection measurement from the upper side. The light reflected from the measurement point becomes an outgoing light via the objective mirror 108 for reflection measurement.

In the optical path for transmission measurement, two fixed mirrors 109, 110 for guiding the incoming light that reflected the switching mirror 105 to an objective mirror 111 for transmission measurement disposed at a lower side of the stage ST are disposed. Then, the incoming light irradiates the measurement point on the sample S via the objective mirror 111 for transmission measurement and the stage ST from the lower side. A hole that penetrates along the optical path is provided to the stage ST. The light that transmitted the measurement point becomes the outgoing light via the objective mirror 108 for reflection measurement.

The outgoing light from the objective mirror 108 for reflection measurement is reflected on a fixed mirror 112, further transmits a separated semi-transparent mirror 113 and an outgoing-side aperture 114 to be guided to an MCT detector. Then, its light intensity is measured by the MCT detector, and a signal detected thereby is supplied to a signal processing device 115. Here, the laser light emitted from a laser 112 is guided to the Michelson interferometer 102, a laser interference wave is generated to detect its light intensity with a photo-diode PD, and a signal detected thereby is supplied to the signal processing device 115 as a sampling signal. This sampling signal is a synchronizing signal of an action of one cycle of a movable mirror of the Michelson interferometer 102. The signal processing device 115 is synchronized with this sampling signal to read out a light-intensity signal from the MCT detector, and obtains an infrared absorption spectrum by performing a well-known signal processing such as Fourier transform, or the like.

Moreover, an optical system for observing the sample S is provided to the microscopic infrared spectroscope 120. When an observation image of the sample S is to be obtained, a visible light (observation light) from a visible light source L reflects the semi-transparent mirror 104 and the switching mirror 105 to become an incoming light. The incoming light proceeds the optical path for reflection measurement or transmission measurement to irradiate the measurement point. The reflected light or the transmission light from the measurement point becomes an outgoing light via the objective mirror 108 for reflection measurement. The outgoing light reflects the fixed mirror 112 and the separated semi-transparent mirror 113 to be guided to a camera 116.

The incoming-side aperture 103 at an exit of the Michelson interferometer 102 and the outgoing-side aperture 114 at an entrance of the MCT detector are provided to be exchangeable respectively. The incoming-side aperture 103 is an aperture selected from a plurality of apertures having holes of different shapes and sizes by an incoming-side aperture switcher SW51. The outgoing-side aperture 114 is an aperture selected from a plurality of apertures having holes of different shapes and sizes by an outgoing-side aperture switcher SW52. The apertures can be suitably changed from the slit-shaped to the pinhole-shaped, for example, by using these aperture switchers SW51, SW52.

Moreover, the MCT detector can be automatically switched to other detectors by a detector automatic switcher SW71. For example, the MCT detector can be suitably switched from a multi-channel linear-array type to a monocular mid-band type.

When the foreign matter in the sample is measured with the microscopic infrared spectroscope 120 having the configuration as described above, the aperture may be optimized as in FIG. 12. FIG. 12 shows a measurement size for one point on the sample when the linear-array detector is used in the microscopic infrared spectroscope, and a measurement size for one point on the sample when the monocular detector is used.

In a case of the linear-array detector (16 channels per one line), the measurement size of one point depends on an element size for one channel of the detector, and the measurement size for one point on the sample is fixed. Whereas, in a case of the monocular detector (one channel only), there is no limitation of the measurement size being fixed, and an aperture size (X, Y, θ) can be optimized in accordance with the size of the foreign matter, so that an absorption spectrum having a good S/N ratio can be obtained. In a case when the aperture has a rectangular opening, X, Y of the aperture size show vertical and horizontal dimensions of the opening part. θ of the aperture size shows a value of a rotation angle of the rectangular opening to the two perpendicular axial directions set on the sample.

As shown in FIG. 11, the aperture switchers SW51, SW52 are provided to the microscopic infrared spectroscope 120 of the present embodiment. It is possible to automatically change to the aperture having the optimal aperture size and change the rotation angle in accordance with the size of the detected foreign matter.

Furthermore, after automatically setting the aperture, spectral measurement of a Fourier transform type can be preformed by increasing the number of integration times, so that an absorption spectrum having a higher S/N ratio can be obtained.

Figure 8:
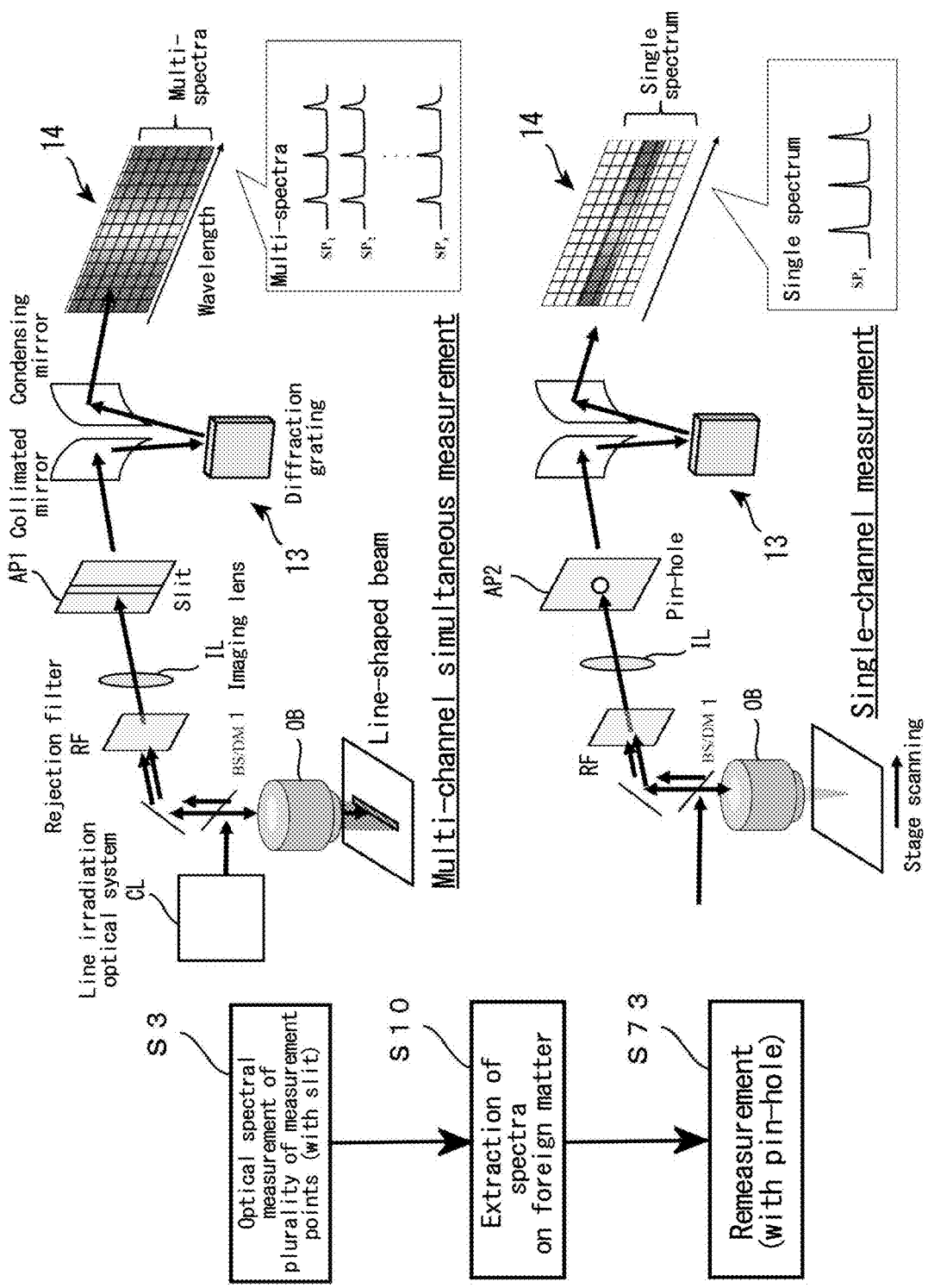
FIG. 8 shows differences between configurations of a microscopic spectroscope using a slit of a third embodiment and a microscopic spectroscope using a pinhole.

According to the foreign matter analysis method by the microscopic Raman spectroscope shown in FIG. 8 to FIG. 10, a technique of foreign matter analysis by a two-stage Raman spectral measurement is established, the technique such that, after sequentially executing the Raman spectral measurement of the plurality of measurement points (step S3) and extraction of the Raman spectra data on the foreign matter (step S10), remeasurement having the measurement points on the foreign matter as the target (step S73) is executed.

Moreover, according to the foreign matter analysis method by the microscopic infrared spectroscope shown in FIG. 11 and FIG. 12, a technique of foreign matter analysis by a two-stage absorption spectral measurement is established, the technique such that, after sequentially executing the absorption spectral measurement of the plurality of measurement points (step S3) and extraction of the absorption spectrum data on the foreign matter (step S10), remeasurement having the measurement points on the foreign matter as the target (step S73) is executed.

That is, in the steps of the first half in these foreign matter analysis methods, the spectral measurement is performed to numerous measurement points in a wide measurement region at high speed (step S3), and distribution of the foreign matters is grasped based on the spectra data (step S10) even if S/N ratio is sacrificed to some extent. In the steps of the second half, the spectrum data having a high S/N ratio is obtained at a state such that the measurement points of the measurement target are limited. By executing such two-stage spectral measurement, foreign matter analysis can be executed at a high speed and with a high analysis accuracy.

Moreover, determination of necessity of remeasurement (step S72) can be executed automatically, so that the two-stage spectral measurement can be executed smoothly as one continuous measurement action.

Figure 13:
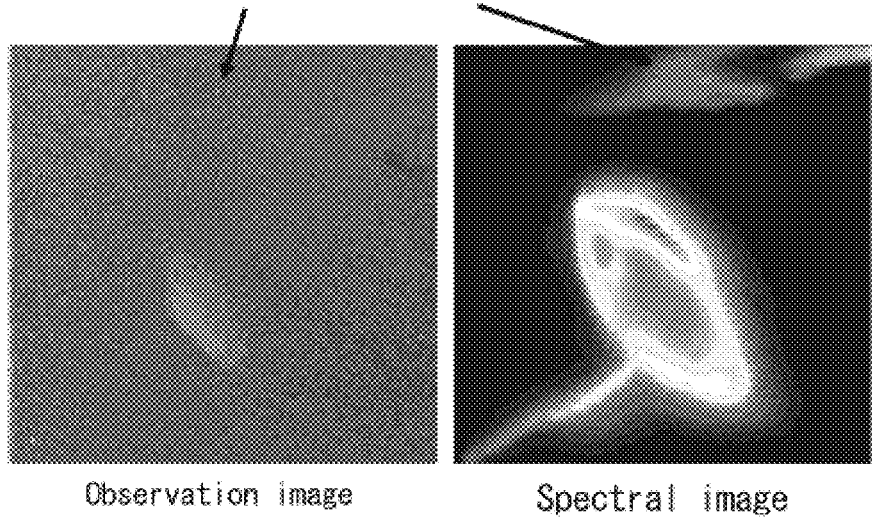
FIG. 13 shows comparison between an observation image and a spectral image that captured a defect of a semiconductor wafer as a foreign matter

The present inventors have gained knowledge of a technique of determining areas of the spectra data that should be retained based on the observation image. However, the function of determining whether the measurement point is on the foreign matter or not from the spectral image like the present embodiment becomes important because of the circumstance shown in FIG. 13. FIG. 13 shows the observation image and the spectral image of which defects of a semi-conductor wafer (SiC) are captured as the foreign matter. That is, it may be sufficient if it is a sample of which the foreign matter can be determined with the observation image; however, there are samples that have parts that are not imaged in the observation image as the foreign matter. Therefore, there are cases that the foreign matter is distinguished for the first time by measuring the spectra data.

A technique of determining the areas of the spectra data that should be retained based on the feature values of the spectra data like the present embodiment is superior for the sample of which determination is difficult with the observation image.

The foreign matter analysis methods of each embodiment have been described based on the microscopic spectroscope using "Raman spectrometry" and "infrared spectrometry"; however, they are not limited thereto. These foreign matter analysis methods can be applied similarly to a foreign matter analysis method by a microscopic spectroscope using other spectrometry.

Figure 14:
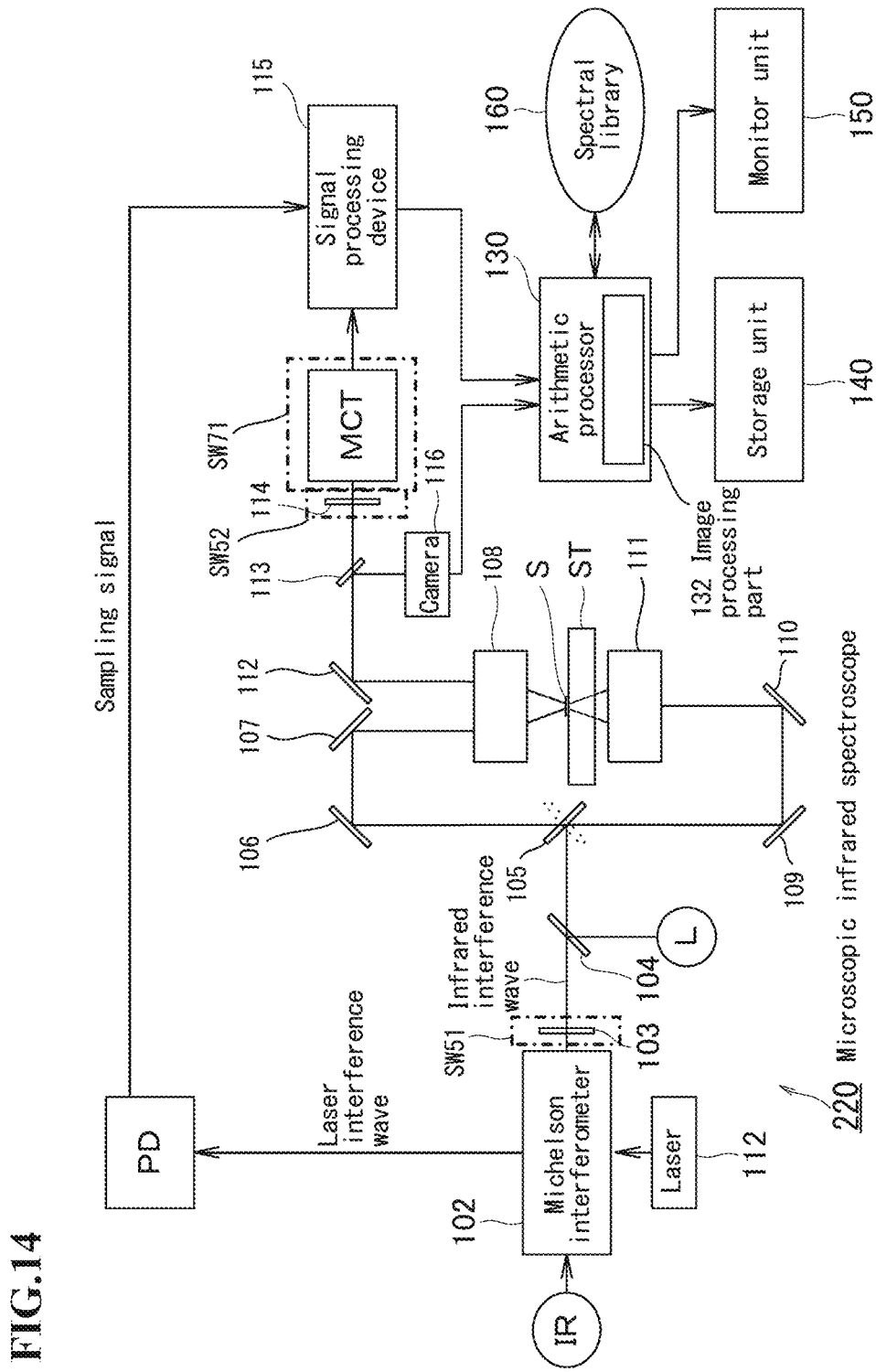
FIG. 14 shows a configuration of a microscopic infrared spectrometer that enables shortening of time required for foreign matter analysis.

Next, similar to the above-described embodiments, one example of a configuration of a microscopic infrared spectroscope that can shorten time required for foreign matter analysis is shown in FIG. 14. A microscopic infrared spectroscope 220 shown in FIG. 14 has a configuration in common with the microscopic infrared spectroscope 120 of FIG. 11, and descriptions are omitted by using the same reference numbers for the common parts.

When the foreign matter in the sample S is measured with the microscopic infrared spectroscope 220 of FIG. 14, sampling is executed for the number of integration times set to one measurement point so that S/N ratio of the absorption spectrum becomes a suitable value. The obtained infrared absorption spectrum is sent from a signal processing device 115 to an arithmetic processor 130. Moreover, the observation image imaged by the camera 116 is also sent to the arithmetic processor 130.

Figure 15:
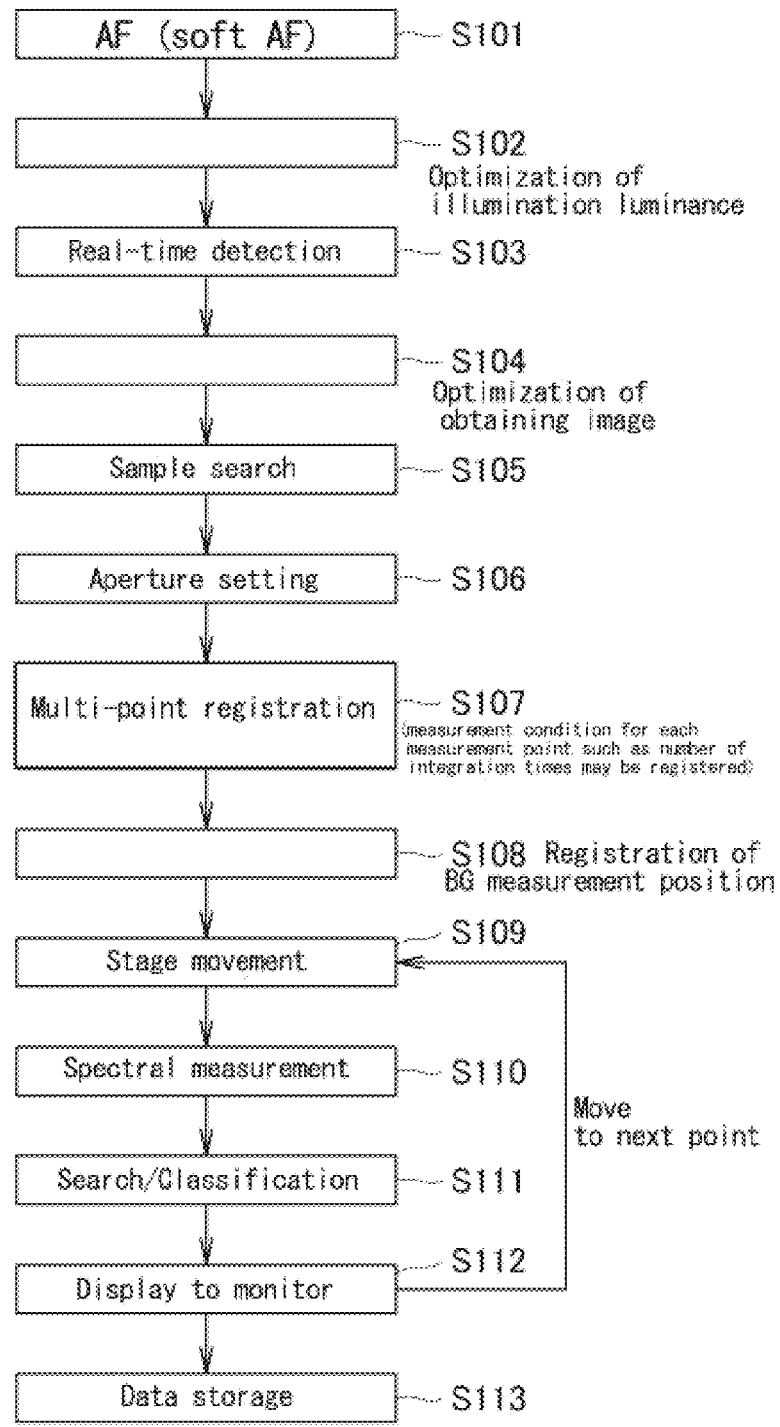
FIG. 15 is a flow of the analysis method using the microscopic infrared spectrometer of FIG. 14.
Figure 16:
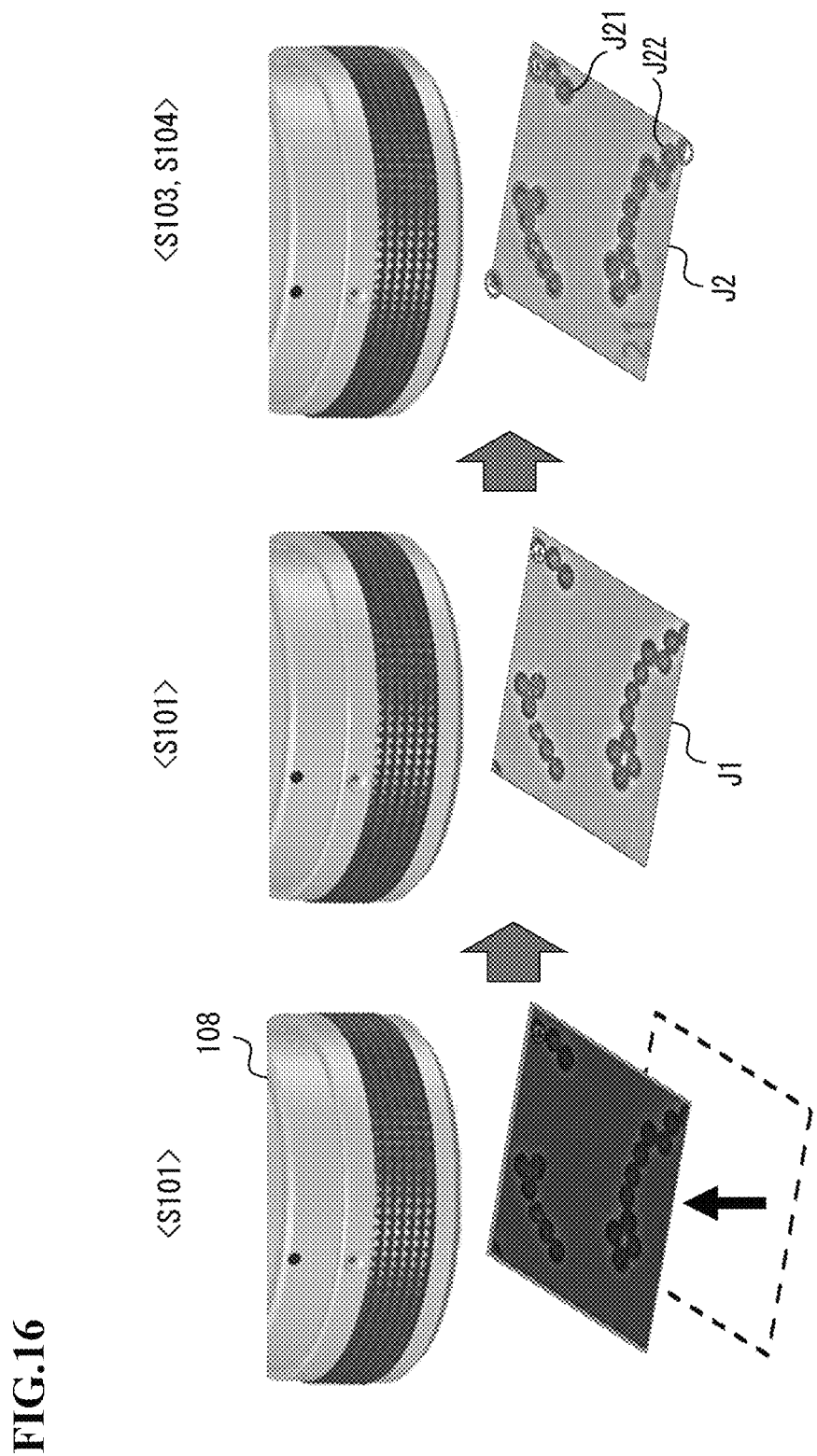
FIG. 16 is a first diagram showing specific examples of each procedure of FIG. 15.

The foreign matter analysis method is described with FIG. 15 to FIG. 17. The arithmetic processor 130 executes the measurement program to execute the flow of FIG. 15 automatically.

The microscopic infrared spectroscope 220 executes an autofocusing to the sample (step S101) to obtain the observation image of the sample with the visible light source L and the camera 116. The specific example of FIG. 16 shows an elevation action of the sample performed by the automatic XYZ stage ST. Next, the microscopic infrared spectroscope 220 optimizes luminance of the observation image of the camera 116 (step S102). In the example of the observation image J1 shown in FIG. 16, the amount of light (brightness) of the visible light source L is adjusted so that the amount of the received light of each pixel of the camera 116 does not saturate.

Next, the arithmetic processor 130 detects measurement candidate positions on the observation image and its number at real-time based on the observation image received from the camera 116 (step S103). Since the observation image is constructed of individual pixel data, the arithmetic processor 130 performs a binarizing processing, for example, to individual pixel datum (luminance value, etc.) to identify the range to be measured and distribution of the range. These identified ranges and the distribution of them are detected as the measurement candidate positions and the number of them. In the example of the observation image J2 of FIG. 16, the arithmetic processor 130 extracts pixels of the same luminance, for example, based on individual pixel datum to identify outlines (J21, J22, etc.) of the range to be measured. Then, the identified outlines and the distribution of them are detected as the measurement candidate positions and the number of them.

The arithmetic processor 130 makes the detected measurement candidate positions and the number to be displayed on the monitor unit 150. Accordingly, the user can recognize, at real-time, these measurement candidate positions that are overlapped on the observation image and displayed. Depending on the operation of the user or the determination of the arithmetic processor 130 itself, the condition of obtaining the observation image may be optimized, and the measurement candidate positions and the number may be re-detected (step S104) based on the observation image that is re-obtained by the arithmetic processor 130.

Next, the arithmetic processor 130 executes sample-search (step S105). Here, the data of the detected measurement candidate positions are transferred to an image processing part 132 for setting the aperture that is installed to the arithmetic processor 130. Then, the image processing part 132 sets the measurement point for spectral measurement based on the transferred data of the measurement candidate positions. Moreover, the image processing part 132 sets suitable apertures 103, 114 to the set measurement point (step S106). For example, the image processing part 132 sets the shape of the measurement point and its size based on the shape of the binarized pixel group or the like. These shapes and sizes of the measurement points become the shapes and sizes of the openings of the apertures. The image processing part 132 may set a rectangular outline of a size such that the outline becomes circumscribed (or inscribed) to the shape of the binarized pixel group. In the example of the observation image J3 of FIG. 17, sizes of the vertical and horizontal directions of the rectangular opening part (J31, J32, etc.) are set for each measurement point. Furthermore, a value of the rotation angle for when the rectangular opening part is rotated based on the two perpendicular directions on the observation image may be set.

Next, the arithmetic processor 130 registers the position data of the measurement points set by the image processing part 132 together with the data of the aperture (size of the frame, rotation angle, etc.) to the storage unit 140 (step S107). The number of integration times set for each measurement point may be registered together as the measurement condition (recipe). This is because S/N ratio can be improved by increasing the number of integration times for minute apertures.

In order to measure the background spectra, the arithmetic processor 130 may set the measurement point for background to register its measurement position data (step S108).

When preparation for measurement as described above is completed, the microscopic infrared spectroscope 220 sequentially measures the optical spectrum to the registered numerous measurement points. In the specific example of FIG. 17, the microscopic infrared spectroscope 220 drives the stage ST in a horizontal direction, positions a spot of the measurement light by the objective mirror 106 to one measurement point (step S109), and measures the optical spectrum in accordance with the recipe (setting of apertures, etc.) registered to the measurement point (step S110). To be in accordance with the registered recipe indicates an action of switching to the aperture set for the measurement point by using the aperture switchers SW51, SW52, an action of switching the detector by using the detector automatic switcher SW71, or the like.

When measurement of the spectrum for one measurement point is completed, the microscopic infrared spectroscope 220 moves the spot to the next measurement point immediately (step S109), and executes measurement of the optical spectrum (step S110), similarly.

The arithmetic processor 130 stores the spectrum received from the microscopic infrared spectroscope 220 together with the position information of the measurement point to the storage unit 140. Moreover, the arithmetic processor 130 searches the spectrum of the known substance having a high degree of coincidence with the spectrum measured for one measurement point from a Spectral library 160. Or, the arithmetic processor 130 classifies the measurement point to a compound group to which the substance of the measurement position will most likely belong based on the measured spectrum (step S111).

The arithmetic processor 130 displays the search result or the classification result of the step S111 as an analysis result to the monitor unit 150 (step S112), and stores the data of the search result or the classification result to the storage unit 140 in a state such that they are related to the position information of the corresponding measurement points (step S113).

As in the display image J4 of the analysis result of FIG. 17, whenever the analysis result of one measurement point comes out corresponding to each aperture frame (J41, J42, etc.) displayed on the monitor unit 150, color-coding display of the analysis result may be executed. That is, the actions of spectral analysis processing by the arithmetic processor 130 (steps S111 to S113) are executed simultaneously with the repetitive actions of spectral measurement by the microscopic infrared spectroscope 220 (steps S109 to S110). While the microscopic infrared spectroscope 220 performs spectral measurement to the measurement points sequentially, the arithmetic processor 130 executes a search or classification of the measured spectra data. Accordingly, even if measurement for all measurement points is not completed, the analysis result of the spectra data measured in advance is displayed to the aperture frame of the corresponding measurement point in the monitor 150 one by one. In the example of the display image J4 of FIG. 17, the result of being classified into 14 classifications of compound groups is color-coded for each group and is displayed inside the aperture frame on the observation image. Here, since the observation image displays to transmit colors that correspond to the analysis result, the user can easily recognize the result of foreign matter analysis.

By applying a microscopic total-reflection measurement apparatus that enables total-reflection measurement by using a total-reflection optical element, the spot position of the measurement light can be moved to the measurement point of target without changing the relative positional relationship between the sample and the objective mirror. Moreover, FIG. 11 is a configuration capable of both of reflection measurement and transmission measurement; however, it may be a configuration capable of either one of reflection measurement or transmission measurement.

The arithmetic processor 130 may execute classification by AI search in the step S111 of spectrum classification.

<Classification of Unknown Compound by AI Search>

Classification by a machine-learned AI search used in each embodiment is briefly described. In the technique of classification by AI search, a plurality of compound groups is set in accordance with the rule-of-thumb, and the optical spectra data of a plurality of known compounds that belongs to the respective compound groups are prepared as known spectra data. Then, a neural network on a computer device reads out the information of the prepared known spectra and the compound groups, and learns features of the spectrum shape that are in common with the plurality of known spectra that belongs to the same compound group.

The learned neural network reads out the optical spectrum of an unknown compound as an unknown spectrum, and outputs the compound group to which the unknown spectrum belongs based on the presence/absence of features of the spectrum shape and the like that are in common. In a preparation stage of the known spectra data, for example, the known spectrum for learning is preferably prepared by determining the belonging to any of compound group by the rule-of-thumb, nevertheless one optical spectrum has features of the spectrum shape that can respectively belong to different compound groups. By using the neural network having a fully connected layer in a learning step, the fully connected layer reads out information of the known spectra data and the corresponding compound groups, and learns features of the spectrum shape and the like in common with the plurality of the known spectrum that belong to the same compound group.

In the conventional analysis technique (so called spectral search) that searches a spectrum of a known substance having a high degree of coincidence with the measured spectrum from a spectral library, the substance in the first place of the hit list of the database is not always correct. Accordingly, in cases when an approximate determination for an unknown substance is required, classification by AI search that can obtain the result in a time shorter than the conventional spectrum search is more useful and is highly practical.

DESCRIPTION OF REFERENCE NUMBERS

3 Spectral measurement command part
4 Feature value calculation part
5 Foreign matter determination part
6 Data retention control part
7 Multivariate analysis part
8 Database search unit
20 Microscopic spectroscope (spectral measurement unit)
30 Arithmetic processor
40 Storage unit
50 Monitor unit
61 Closed-region registration part
71 Averaging processing part
72 Remeasurement determination part
73 Remeasurement command part
120 Microscopic infrared spectroscope (spectral measurement unit)
130 Arithmetic processor
140 Storage unit
150 Monitor unit
220 Microscopic infrared spectroscope

What is claimed is:

1. A method of analyzing foreign matter in a measurement target comprising:
   partitioning a measurement region on the measurement target into a plurality of measurement points, and measuring an optical spectrum for each of the plurality of measurement points;
   calculating a feature value of each measured spectrum;
   determining whether each of the measurement points is on the foreign matter or not based on each feature value;
   retaining the spectrum of the measurement point that is determined to be on the foreign matter, and
   deleting the spectrum of the measurement point that is not determined to be on the foreign matter or storing the same to a storage unit; and
   analyzing the foreign matter based on spectra of the plurality of measurement points that are determined to be on the foreign matter, in more detail than in the calculation of the feature values.

2. The method of claim 1, wherein the feature value is compared with a certain threshold to determine whether each of the measurement points is on the foreign matter or not.

3. The method of claim 1, wherein a total area of the spectrum, a value that shows correlation to a reference spectrum, a peak wavenumber value by comparing with a standard deviation spectrum, or a numerical value that corresponds thereto is calculated as the feature value of each spectrum.

4. The method of claim 1, wherein,
   calculation of the feature value,
   determination of whether the measurement point is on the foreign matter or not,
   retention of the spectrum of the measurement point that is determined to be on the foreign matter, and
   deletion or storage of the spectrum of the measurement point that is not determined to be on the foreign matter are sequentially repeated during measurement of the optical spectrum.

5. The method of claim 1, wherein, when the storage unit stores the spectrum, the spectrum of the measurement point that is not determined to be on the foreign matter is stored distinguishably from the spectrum of the measurement point that is determined to be on the foreign matter.

6. The method of claim 1, wherein
a timing of retaining the spectrum is a timing when a group of the measurement points that are determined to be on the foreign matter becomes surrounded by the measurement points that are not determined to be on the foreign matter, and
the group of spectra of the measurement points that are determined to be on the foreign matter is retained as a data group that represents one foreign matter.

7. The method of claim 1, wherein optical spectra of the plurality of measurement points are detected simultaneously with a multi-channel detector that can detect lights from the plurality of measurement points separately.

8. The method of claim 1, wherein, the retention of the spectrum includes;
regarding the measurement points that are determined to be on the foreign matter and are adjacent to each other as one group,
calculating an average spectrum based on spectra of the measurement points included in the group, and
retaining the average spectrum as the spectrum of the measurement point that is included in the group, and the average spectra are used to analyze the foreign matter.

9. The method of claim 1, wherein, after determining whether the measurement points are on the foreign matter or not,
at least a part of the measurement points that are determined to be on the foreign matter is subjected to remeasurement;
at least one of measurement conditions (i) to (v) is changed;
(i) a wavelength of an irradiation light to the measurement point;
(ii) a condition of an exposure time or the number of integration times;
(iii) an irradiation range of the irradiation light to the measurement point;
(iv) a type of a detector that detects the light from the measurement point; and
(v) a type of an aperture disposed at any position on an optical path from the measurement point to the detector,
the optical spectrum of the measurement point that is subjected to remeasurement is remeasured at S/N ratio higher than before the change of the measurement condition; and
the remeasured spectra are used to analyze the foreign matter.

10. The method of claim 9, wherein, when measuring optical spectra, the optical spectra of the plurality of measurement points are detected simultaneously with a multi-channel detector that can detect lights from the plurality of measurement points separately, and
when remeasuring optical spectra, at least the shape of the hole of the aperture is changed, the multi-channel detector is changed to a single-channel detector to detect the optical spectrum of one measurement point.

11. The method of claim 9, wherein the optical spectrum of the measurement point is remeasured in a case when S/N ratio of the previous spectrum of the measurement point that is determined to be on the foreign matter is lower than a standard value.

12. The method of claim 11, wherein the case when S/N ratio is lower than the standard value is a case when a total area of the spectrum is above a predetermined size.

13. The method of claim 1, further comprising: identifying the constituents of the foreign matter with a spectrum search program using a database.

14. A non-transitory computer-readable storage medium that stores a program for foreign matter analysis that makes a computer to execute the method of any one of claims 1 to 13.

15. An apparatus for analyzing foreign matter in a measurement target comprising:
a spectral measurement unit that partitions a measurement region on the measurement target into a plurality of measurement points, and is capable of measuring an optical spectrum for each of the plurality of measurement points;
a foreign matter determination unit that calculates a feature value of each measured spectrum to determine whether each of the measurement points is on the foreign matter or not based on each feature value;
a data retention controller that retains the spectrum of the measurement point that is determined to be on the foreign matter, and deletes the spectrum of the measurement point that is not determined to be on the foreign matter or stores the same to a storage unit; and
a foreign matter analyzing unit that analyzes the foreign matter based on spectra of the plurality of the measurement points that are determined to be on the foreign matter, in more detail than in calculation of the feature values.

* * * * *